United States Patent
Li

(10) Patent No.: US 12,225,575 B2
(45) Date of Patent: Feb. 11, 2025

(54) COMMUNICATION METHOD AND APPARATUS

(71) Applicant: HUAWEI TECHNOLOGIES CO., LTD., Guangdong (CN)

(72) Inventor: Chao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 490 days.

(21) Appl. No.: 17/670,574

(22) Filed: Feb. 14, 2022

(65) Prior Publication Data
US 2022/0167374 A1   May 26, 2022

Related U.S. Application Data

(63) Continuation of application No. PCT/CN2020/105643, filed on Jul. 29, 2020.

(30) Foreign Application Priority Data

Aug. 15, 2019   (CN) .......................... 201910755311.1

(51) Int. Cl.
*H04W 72/566* (2023.01)
*H04W 72/1263* (2023.01)
(Continued)

(52) U.S. Cl.
CPC ..... *H04W 72/569* (2023.01); *H04W 72/1263* (2013.01); *H04L 1/1812* (2013.01); *H04W 4/40* (2018.02)

(58) Field of Classification Search
CPC . H04W 72/569; H04W 72/1263; H04W 4/40; H04W 72/20; H04W 72/23;
(Continued)

(56) References Cited

U.S. PATENT DOCUMENTS

2016/0219450 A1* 7/2016 Wakabayashi ........ H04L 5/0053
2018/0063821 A1* 3/2018 Huang ................. H04J 11/0069
(Continued)

FOREIGN PATENT DOCUMENTS

| CN | 103841562 A | 6/2014 |
|---|---|---|
| CN | 107787044 A | 3/2018 |

(Continued)

OTHER PUBLICATIONS

Extended European Search Report issued in EP20852784.6, dated Aug. 30, 2022, 6 pages.
(Continued)

*Primary Examiner* — Hardikkumar D Patel

(57) ABSTRACT

A communication method and apparatus are provided. The method may be applied to internet of vehicles, for example, V2X, LTE-V, or V2V, or may be applied to fields such as intelligent driving and an intelligent connected vehicle. The method includes: A first device determines a first resource and a second resource; and the first device sends or receives first data on a resource other than at least one time domain symbol on the first resource, and sends or receives control information on the second resource, when the first resource and the second resource overlap in the at least one time domain symbol; or the first device sends or receives first data on the first resource, and discards or skips receiving control information in at least one time domain symbol.

17 Claims, 21 Drawing Sheets

(51) Int. Cl.
*H04L 1/1812* (2023.01)
*H04W 4/40* (2018.01)

(58) Field of Classification Search
CPC ... H04L 1/1812; H04L 1/0068; H04L 1/1887; H04L 1/1893; H04L 27/2602; H04L 5/0053; H04L 5/0044; H04L 67/12; H04L 5/001; H04L 27/2601; H04L 5/0007; H04L 5/0055; H04L 5/0094
See application file for complete search history.

(56) References Cited

U.S. PATENT DOCUMENTS

| | | | |
|---|---|---|---|
| 2018/0206260 A1* | 7/2018 | Khoryaev | H04W 72/56 |
| 2018/0227910 A1 | 8/2018 | Hong et al. | |
| 2019/0045470 A1 | 2/2019 | Chervyakov et al. | |
| 2020/0296735 A1* | 9/2020 | Makki | H04W 72/12 |
| 2021/0385023 A1* | 12/2021 | Wang | H04L 1/1861 |

FOREIGN PATENT DOCUMENTS

| | | |
|---|---|---|
| CN | 108347318 A | 7/2018 |
| CN | 108632011 A | 10/2018 |
| CN | 109150424 A | 1/2019 |
| CN | 109618362 A | 4/2019 |
| CN | 109644371 A | 4/2019 |
| CN | 110034885 A | 7/2019 |
| JP | 2017528080 A | 9/2017 |
| WO | 2017116108 A1 | 7/2017 |
| WO | 2018133843 A1 | 7/2018 |
| WO | 2018228492 A1 | 12/2018 |
| WO | 2019029652 A1 | 2/2019 |

OTHER PUBLICATIONS

Office Action issued in CN201910755311.1, dated Oct. 27, 2022, 5 pages.
R1-1904494, MediaTek Inc., On sidelink resource allocation mechanism, 3GPP TSG RAN WG1 Meeting #96bis, Xian, China, Apr. 8-12, 2019, 10 pages.
R1-1907018, LG Electronics, Discussion on physical layer procedures for NR sidelink, 3GPP TSG RAN WG1 Meeting #97, Reno, USA, May 13-17, 2019, 13 pages.
Office Action issued in JP2022-509687, dated Jan. 30, 2023 with English Translation, 7 pages.
Office Action issued in JP2022-509687, dated May 22, 2023, English Translation, 7 pages.
International Search Report and Written Opinion issued in PCT/CN2020/105643, dated Oct. 26, 2020, 10 pages.
Office Action issued in CN201910755311.1, dated Jul. 9, 2021, 6 pages.
3GPP TSG RAN WG1 Meeting #98 R1-1908279,:"Physical Layer Procedures for Sidelink"TCL Communication et al., Aug. 26-30, 2019, total 14 pages.
3GPP TSG RAN WG1 #97 R1-1906553: Discussion on sidelink physical layer structure MediaTek Inc et al., May 13-17, 2019, total 16 pages.
Office Action issued in KR2022-7008333 with English translation, dated Oct. 14, 2024, 8 pages.

* cited by examiner

COMMUNICATION METHOD AND APPARATUS

CROSS-REFERENCE TO RELATED APPLICATIONS

This application is a continuation of International Application No. PCT/CN2020/105643, filed on Jul. 29, 2020, which claims priority to Chinese Patent Application No. 201910755311.1, filed on Aug. 15, 2019. The disclosures of the aforementioned applications are hereby incorporated by reference in their entireties.

TECHNICAL FIELD

This application relates to the field of communication technologies, and in particular, to a communication method and apparatus.

BACKGROUND

As a key technology of a future intelligent transportation system (ITS), the internet of vehicles has attracted more and more attention recently. A vehicle-to-everything (V2X) system is a key technology in the internet of vehicles. The V2X includes vehicle-to-vehicle (V2V), vehicle-to-infrastructure (V2I), and vehicle-to-pedestrian (V2P) direct communication, and vehicle-to-network (V2N) communication interaction. Uplinks and downlinks are used for V2N (vehicle-to-network) communication, and sidelinks (SLs) are used for V2V/V2I/V2P data communication.

In V2X technologies, to improve transmission reliability, it is agreed in a 3GPP standard conference that a physical sidelink feedback channel (PSFCH) is defined in the scope of sidelinks. The PSFCH is used to send sidelink feedback control information (SFCI), and may be used by at least a receive end to feed back, to a transmit end, an acknowledgement message and the like indicating whether the information is received successfully.

In a possible scenario, one terminal device may simultaneously communicate with one or more terminal devices. In this case, one terminal device may receive data sent by another terminal device. Correspondingly, the terminal device needs to provide feedback to a plurality of data transmissions. If a plurality of data channel time domain resources correspond to one PSFCH time domain resource, one terminal device sends data on the plurality of data channel time domain resources, and corresponding receive UE needs to provide feedback to the plurality of data channel transmissions. In this case, a resource conflict may occur.

SUMMARY

This application provides a communication method and apparatus, so that a terminal device can properly transmit data and/or feedback information, thereby ensuring reliability of transmission of the data and/or the feedback information.

According to a first aspect, an embodiment of this application provides a communication method. In the method, a first device determines a first resource and a second resource; and the first device sends or receives first data on a resource other than at least one time domain symbol on the first resource, and the first device sends or receives control information on the second resource, when the first resource and the second resource overlap in the at least one time domain symbol; or the first device sends or receives first data on the first resource, and the first device discards or skips receiving control information in at least one time domain symbol, when the first resource and the second resource overlap in the at least one time domain symbol. The first resource is used to send or receive the first data, the second resource is used to send or receive the control information, and the control information corresponds to second data.

The first device may be a communication device or a communication apparatus that can support the communication device in implementing a function required by the method, such as a chip system or a communication module in the communication device.

For example, the communication device may be a terminal device or a network device. Similarly, a second device may be a communication device or a communication apparatus that can support the communication device in implementing a function required by the method, such as a chip system or a communication module in the communication device. For example, the communication device may be a terminal device or a network device.

In this technical solution, when the first device determines that the first resource used to send or receive the first data overlaps the second resource used to send or receive the control information, the first device may determine how to send or receive the first data on the first resource. For example, the first device sends or receives the first data on a resource other than an overlapping resource on the first resource, or the first device may determine to send or receive the first data and discard or skip receiving the control information on the first resource. In other words, a solution of how the first device transmits the first data and/or the control information is provided, so that reliability of transmission of the data and/or the control information can be ensured.

In a possible implementation, cases in which the first resource and the second resource overlap in the at least one time domain symbol include but are not limited to the following several cases:

Case 1: The first resource is located in a first resource pool, the second resource is located in a second resource pool, the second resource pool includes transmission resources that are for the control information and whose period is N, and the first resource pool does not include a transmission resource for sending the control information, or the first resource pool includes transmission resources that are for the control information and whose period is M, where M and N are positive integers, and M is greater than N.

Case 2: The first resource and the second resource are located in a same frequency band, a same carrier, or a same bandwidth part.

Case 3: The first resource pool and the second resource pool are located on a same carrier or bandwidth part;
  the first resource pool is located on a first carrier, the second resource pool is located in a second carrier pool, and the first carrier and the second carrier belong to a same frequency band; or
  the first resource pool is located in a first bandwidth part, the second resource is located in a second bandwidth part, and the first bandwidth part and the second bandwidth part are located on a same carrier or on different carriers in a same frequency band.

Case 4: The first resource and the second resource are located in a same slot, the second resource is located in the last K symbols in the slot in which the first resource is located, and K is a positive integer greater than or equal to 1.

Case 5: The at least one time domain symbol is a symbol occupied by the control information; the at least one time domain symbol is a symbol occupied by the control information and a blank symbol used for sending or receiving the control information or used for switching between sending and receiving of the control information; or the at least one time domain symbol is a symbol occupied by the control information, a blank symbol used for switching between sending and receiving of the control information, and a symbol used for receiving automatic gain control.

In actual application, there may be a plurality of cases in which the first resource overlaps the second resource. For each of the foregoing enumerated five overlapping cases, this embodiment provides a solution for the first device to transmit the first data and/or the control information. Therefore, for the plurality of application scenarios, the reliability of the transmission of the first data and/or the control information can be improved.

In a possible implementation, that the first device sends or receives the first data on a resource other than at least one time domain symbol on the first resource, and the first device sends or receives the control information on the second resource, when the first resource and the second resource overlap in the at least one time domain symbol includes:

the first device sends or receives the first data on the resource other than the at least one time domain symbol on the first resource, and the first device sends or receives the control information on the second resource, when the first resource and the second resource overlap in the at least one time domain symbol, and a priority of the first data is lower than a priority of the second data.

In the technical solution, a solution of how the first device transmits the first data and/or the control information, that is, a first solution, is provided: When determining that the priority of the first data is lower than the priority of the second data, the first device determines to send or receive the first data on the resource, other than the resource overlapping the second resource, on the first resource, and send or receive the control information on the second resource.

In a possible implementation, that the first device sends or receives the first data on the first resource, and the first device discards or skips receiving the control information in at least one time domain symbol, when the first resource and the second resource overlap in the at least one time domain symbol includes:

The first device sends or receives the first data on the first resource, and the first device discards or skips receiving the control information in the at least one time domain symbol, when the first resource and the second resource overlap in the at least one time domain symbol, and the priority of the first data is higher than the priority of the second data.

In the technical solution, a solution of how the first device transmits the first data and/or the control information, that is, a second solution, is provided: When determining that the priority of the first data is higher than the priority of the second data, the first device determines to send or receive the first data on the first resource, and discard or skip receiving the control information on the overlapping resource of the first resource and the second resource. In this way, data of a high priority can be preferentially processed, that is, transmission of important data can be preferentially ensured, and an impact on a to-be-processed communication service can be reduced.

In a possible implementation, when the first resource and the second resource overlap in the at least one time domain symbol, the first device preferentially sends or receives the control information, and sends or receives the first data on the resource other than the at least one time domain symbol on the first resource; or the first device preferentially sends or receives the first data on the first resource, and the first device discards or skips receiving the control information in the at least one time domain symbol.

In this technical solution, a solution of how the first device transmits the first data and/or the control information, that is, a third solution, is provided: According to a protocol or an agreement made in advance, the first device preferentially sends or receives the first data or preferentially sends or receives the control information without considering priorities of the first data and the control information.

In a possible implementation, the method further includes:

when the priority of the first data is the same as the priority of the second data, the first device determines, based on first information, to send or receive the first data on the resource other than the at least one time domain symbol on the first resource, and the first device determines to send or receive the control information on the second resource; or the first device sends or receives the first data on the first resource, and the first device discards or skips receiving the control information in the at least one time domain symbol.

In this technical solution, a solution of how the first device transmits the first data and/or the control information, that is, a fourth solution, is provided: If the priority of the first data is the same as the priority of the second data, the first device may determine, based on the first information, whether to use the first solution or the second solution. For example, the first information is a time margin of the first data, or the first information is that a sending manner of the first data is broadcast or the first data is blindly transmitted data. For example, a communication service that has a short time margin and that can better match a low latency is preferentially sent. For another example, it is preferentially ensured that data whose sending manner is broadcast is sent, so as to ensure that as many second devices as possible receive the data, thereby reducing a quantity of data retransmission times, and improving data transmission efficiency. For another example, it can be preferentially ensured that data whose sending manner is unicast is received, so as to improve a success rate of receiving the data by the second device.

In a possible implementation, the priority of the first data is a priority of a resource pool, a bandwidth part, a first subcarrier spacing, or a carrier on which the first data is located, and the priority of the second data is a priority of a resource pool, a bandwidth part, a second subcarrier spacing, or a carrier on which the second data is located; or the priority of the first data is a priority of the first data, and the priority of the second data is a priority of the second data; or the priority of the first data is greater than a first threshold and/or the priority of the second data is lower than a second threshold.

In the foregoing technical solution, a plurality of specific implementation forms of the priority of the first data and the priority of the second data are enumerated, so that the priority of the first data and the priority of the second data can be compared from a plurality of perspectives, which is flexible.

In a possible implementation, that the first device determines, based on first information, to send the first data on the resource other than the at least one time domain symbol on the first resource includes:

The first device performs rate matching on the first data in the at least one time domain symbol, where the rate matching means that when performing channel coding on the first data, the first device does not map the first data to a physical resource in the at least one time domain symbol.

In a possible implementation, that the first device determines, based on first information, to send the first data on the resource other than the at least one time domain symbol on the first resource includes:

The first device punctures the first data in the at least one time domain symbol, where the puncturing means that when performing channel coding on the first data, the first device does not map the first data to all physical resources, and specifically does not map the first data to the at least one time domain symbol during transmission.

In a possible implementation, that the first device determines, based on first information, to receive the first data on the resource other than the at least one time domain symbol on the first resource includes:

The first device punctures the first data when receiving the first data, where the puncturing means not to receive data or a signal at a puncturing position or the puncturing means setting received data or a received signal to 0 in a decoder at the puncturing position, and the puncturing location is the at least one time domain symbol.

In a possible implementation, the first device and the second device may notify each other of a solution of transmitting the first data and/or the control information:

In a solution in which the first device notifies the second device, the first device sends first indication information to the second device when sending the first data.

The first indication information is used to indicate the first device not to send the first data or to send the control information on the at least one time domain symbol on the first resource; or the first indication information is used to indicate the first device to send the first data or not to send the control information on the at least one time domain symbol on the first resource.

In a solution in which the second device notifies the first device, the first device receives second indication information from the second device.

The second indication information is used to indicate the second device not to send the first data or to send the control information on the at least one time domain symbol on the first resource; or the second indication information is used to indicate the second device to send the first data or not to send the control information on the at least one time domain symbol on the first resource.

In the foregoing technical solution, the solution in which the first device notifies the second device that the first device transmits the first data and/or the control information is indicated by using the first indication information; similarly, the solution in which the second device notifies the first device that the second device transmits the first data and/or the control information is indicated by using the second indication information, so that the first device or the second device can correctly receive the first data or the control information.

In a possible implementation, the method further includes:

when the first indication information indicates a first value, the first indication information is used to indicate the first device not to send the first data or to send the control information on the at least one time domain symbol on the first resource; or when the first indication information indicates a second value, the first indication information is used to indicate the first device to send the first data or not to send the control information on the at least one time domain symbol on the first resource.

In a possible implementation, the method further includes:

when the second indication information indicates a first value, the second indication information is used to indicate the second device not to send the first data or to send the control information on the at least one time domain symbol on the first resource; or when the second indication information indicates a second value, the second indication information is used to indicate the second device to send the first data or not to send the control information on the at least one time domain symbol on the first resource.

In the foregoing technical solution, the first indication information or the second indication information may indicate, by using different values, solutions for transmitting the first data and/or the control information, which is simple.

In a possible implementation, the control information is hybrid automatic repeat request (HARQ) acknowledgement information or scheduling information indicating data transmission.

In this embodiment, two specific implementation forms of the control information are enumerated. A specific implementation form of the control information is not limited in this embodiment, and the control information may alternatively be other possible information.

According to a second aspect, an embodiment of this application provides a communication method. In the method, a first device determines a first slot and at least two second slots, where the first slot and the at least two second slots completely or partially overlap in time domain, and frequency domain resources of the first slot and the at least two second slots are different. Then, the first device sends or receives first information in the first slot based on sending/receiving states of the first device in the first slot and the at least two second slots, and sends or receives second information in at least one second slot in the at least two second slots.

This technical solution provides a solution for the first device to transmit the first information and/or the second information in the first slot and the at least two second slots that have overlapping time domain resources and different frequency domain resources. That is, how to transmit the first information and/or the second information is determined based on the sending/receiving states in the first slot and the at least two second slots, to ensure reliability of transmission of the first information and/or the second information.

In a possible implementation, the first information includes data and/or control information, and the second information includes data and/or control information.

The foregoing technical solution provides a solution of transmitting the data and/or the control information in a plurality of application scenarios, for example, a solution for the first device to send or receive the data in the first slot and the at least two second slots, a solution for the first device to send or receive the control information in the first slot and at least two second slots, or a solution for the first device to send or receive the data in the first slot and send or receive the control information in the at least two second slots.

In a possible implementation, this embodiment provides several cases of the first slot and the at least two second slots.

Case 1: A first subcarrier spacing of the first slot is less than a second subcarrier spacing of the at least two second slots.

Case 2: The first subcarrier spacing is 15 kHz and the second subcarrier spacing is 30 kHz;
the first subcarrier spacing is 15 kHz and the second subcarrier spacing is 60 kHz; or
the first subcarrier spacing is 30 kHz and the second subcarrier spacing is 60 kHz.

Case 3: The first slot and the at least two second slots are located in a same frequency band, a same carrier, or a same bandwidth part.

Case 4: The at least two second slots are two second slots consecutive in time domain.

In the technical solution, several cases of the first slot and the at least two second slots are enumerated. In other words, for each case, a solution for the first device to transmit the first information and/or the second information is provided. Therefore, for a plurality of application scenarios, the reliability of the transmission of the first information and/or the second information can be improved.

In a possible implementation, based on the sending/receiving states of the first device in the first slot and the at least two second slots, solutions for the first device to transmit the first information and/or the second information may be different:

Case 1: The sending/receiving states of the first device in the first slot and the at least two second slots are a sending state, and the first device sends the first information in the first slot, and sends the second information in the at least two second slots:

Manner 1: The first device skips sending the first information in the last symbol in the first slot, and the first device skips sending the second information in the last symbol in each second slot in the at least two second slots.

Manner 2: The first device skips sending the first information in the last symbol in the first slot, and the first device skips sending the second information in the last symbol in the last second slot in the at least two second slots, where transmit power of the first device in each second slot in the at least two second slots is the same or transmit power of the first device on each subcarrier in each second slot is the same.

In this embodiment, for Case 1, two transmission manners of the first information and/or the second information are provided. To be specific, in Manner 1, the first device may not send the first information or the second information in the first slot and the last symbol in each second slot. This can avoid a resource conflict problem caused because the last symbol in the at least two second slots is used, for example, as a blank symbol for switching between sending and receiving, or used for other purposes. Further, in Manner 2, transmission in each slot or on each carrier may be independently performed, and transmit power of the first device in each second slot is the same or transmit power of the first device on each subcarrier in each second slot is the same. Therefore, reliability of transmission in each slot or carrier can be ensured, and reliability of information transmission is further improved.

Case 2: The sending/receiving states of the first device in the first slot and the at least two second slots are a receiving state, and the first device receives the first information in the first slot, and receives the second information in the at least two second slots:

Manner 1: The first device skips receiving the first information in the first symbol in the first slot, and the first device punctures the second information in the first K symbols in the first second slot in the at least two second slots, where the puncturing means not to receive data or a signal at a puncturing position or the puncturing means setting received data or a received signal to 0 in a decoder at the puncturing position, the puncturing position is the K symbols, and K is a positive integer not less than a ratio of a second subcarrier spacing to a first subcarrier spacing. Manner 2: The first device punctures the first information in an overlapping symbol of the first slot and the first symbol in each second slot in the at least two second slots, and punctures the second information in the first symbol in each second slot, where the puncturing means not to receive data or a signal at a puncturing position or the puncturing means setting received data or a received signal to 0 in a decoder at the puncturing position, and the puncturing position is the overlapping symbol.

In this technical solution, for Case 2, two transmission manners of the first information and/or the second information are provided. Because the first symbol of the first slot may be used for other purposes, for example, as a symbol for automatic gain control, a symbol that is in the at least two second slots and that overlaps the first symbol is also damaged. Therefore, in this embodiment, according to Manner 1 and Manner 2, it can avoid that the first information and/or the second information is damaged during transmission.

Case 3: The sending/receiving state of the first device in the first slot is a sending state, the sending/receiving state of the first device in the at least two second slots is a receiving state, and the first device sends the first information in the first slot, and receives the second information in the at least two second slots:

Manner 1: When a first priority is higher than a second priority, the first device sends the first information and skips receiving the second information in the first slot.

Manner 2: When a first priority is lower than a second priority, the first device discards the first information and receives the second information in the first slot.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

In this technical solution, because sending the first information and receiving the second information may cause a resource conflict, for Case 3, two transmission manners of the first information and/or the second information, Manner 1 and Manner 2, are provided. Therefore, how to transmit the first information and/or the second information may be determined mainly based on the first priority and the second priority. In this way, transmission of important data can be preferentially ensured, a quantity of data retransmission times can be reduced, thereby improving data transmission efficiency. Alternatively, when a priority is a priority of a resource, data transmission on different resources may be preferentially ensured. Different resources may correspond to different services, and services may be classified based on resources during operation. Therefore, data transmission for different services only needs to be transmitted on corresponding resources, thereby reducing complexity.

Case 4: The sending/receiving state of the first device in the first slot is a sending state, and the sending/receiving state of the first device in the at least two second slots includes the sending state or a receiving state; the first device sends the second information in a first part of second slots in the at least two second slots, and receives the second information in a second part of second slots in the at least two second slots; and the first device sends the first information in the first slot, and sends or receives the second information in the at least two second slots.

Manner 1: When a first priority is higher than a second priority, the first device sends the first information in the first slot, and the first device sends the second information in the first part of second slots.

Manner 2: When a first priority is lower than a second priority, the first device sends the first information in a symbol that is in the first slot and that does not overlap the first part of second slots, and the first device sends the second information in the first part of second slots and/or receives the second information in the second part of second slots.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

In this technical solution, because sending the first information and receiving the second information may cause a resource conflict, for Case 4, namely, a case in which a sending-receiving conflict exists in some second slots in the at least two second slots and the first slot, two transmission manners of the first information and/or the second information, Manner 1 and Manner 2, are provided. Therefore, how to transmit the first information and/or the second information may be determined mainly based on the first priority and the second priority. In this way, reliability of transmission of the first information and/or the second information is ensured.

In a possible implementation, that the first device sends the first information on a resource that is in the first slot and that does not overlap the part of second subslots includes:

The first device sends the first information on a resource, on resources overlapping the first part of second slots, other than a symbol corresponding to a sending-receiving switching interval between the first part of second slots and the second part of second slots.

In this technical solution, when sending the first information in the first slot, the first device sends the first information on the resource other than the resources overlapping the first part of second slots and other than the symbol that is in the second slot and that is used as a sending-receiving switching interval. This avoids damage to the first information because the resource other than the overlapping resources includes the symbol used as a sending-receiving switching interval.

In a possible implementation, the first device and the second device may notify each other of a solution of transmitting the first information and/or the second information:

In a solution in which the first device notifies the second device, the first device sends third indication information.

The third indication information is used to indicate the first device to send the first information in all symbols in the first slot; or the third indication information is used to indicate the first device to send the first information in some symbols in the first slot.

In a solution in which the second device notifies the first device, the first device receives fourth indication information from the second device.

The fourth indication information is used to indicate the second device to send the first information in all symbols in the first slot; or the fourth indication information is used to indicate the second device to send the first information in some symbols in the first slot.

In the foregoing technical solution, the solution in which the first device notifies the second device that the first device transmits the first information and/or the second information is indicated by using the third indication information; similarly, the solution in which the second device notifies the first device that the second device transmits the first information and/or the second information is indicated by using the fourth indication information, so that the first device or the second device can correctly receive the first information or the second information.

Case 5: The sending/receiving state of the first device in the first slot is a receiving state, and the sending/receiving state of the first device in the at least two second slots includes a sending state or the receiving state; the first device sends the second information in a first part of second slots in the at least two second slots, and receives the second information in a second part of second slots in the at least two second slots; and the first device receives the first information in the first slot, and sends or receives the second information in the at least two second slots.

Manner 1: When a first priority is higher than a second priority, the first device receives the first information in the first slot, and the first device receives the second information in the first part of second slots.

Manner 2: When a first priority is lower than a second priority, the first device receives the first information in a symbol that is in the first slot and that does not overlap the first part of second slots, and the first device sends the second information in the first part of second slots and/or receives the second information in the second part of second slots.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

In this technical solution, because receiving the first information and sending the second information may cause a resource conflict, for Case 5, namely, a case in which a sending-receiving conflict exists in some second slots in the at least two second slots and the first slot, two transmission manners of the first information and/or the second information, Manner 1 and Manner 2, are provided. Therefore, how to transmit the first information and/or the second information may be determined mainly based on the first priority and the second priority. In this way, reliability of transmission of the first information and/or the second information is ensured.

In a possible implementation, the first device and the second device may notify each other of a solution of transmitting the first information and/or the second information:

In a solution in which the first device notifies the second device, the first device sends fifth indication information.

The fifth indication information is used to indicate the first device to receive the first information in all symbols in the first slot; or the fifth indication information is used to indicate the first device to receive the first information in some symbols in the first slot.

In a solution in which the second device notifies the first device, the first device receives sixth indication information from the second device.

The sixth indication information is used to indicate the second device to send the first information in all symbols in the first slot; or the sixth indication information is used to indicate the second device to send the first information in some symbols in the first slot.

In the foregoing technical solution, the solution in which the first device notifies the second device that the first device transmits the first information and/or the second information is indicated by using the fifth indication information; similarly, the solution in which the second device notifies the first device that the second device transmits the first information and/or the second information is indicated by using the sixth indication information, so that the first device or the second device serving as a receive end determines, based on the first information and/or the second information, whether to receive data in the entire slot.

According to a third aspect, an embodiment of this application provides a communication apparatus, including a processing unit and a transceiver unit.

The processing unit is configured to determine a first resource and a second resource, where the first resource is used to send or receive first data, the second resource is used to send or receive control information, and the control information corresponds to second data.

The transceiver unit is configured to: send or receive the first data on a resource other than at least one time domain symbol on the first resource, and send or receive the control information on the second resource, when the first resource and the second resource overlap in the at least one time domain symbol.

Alternatively, the transceiver unit is configured to: send or receive the first data on the first resource, and discard or skip receiving the control information in at least one time domain symbol, when the first resource and the second resource overlap in the at least one time domain symbol.

In a possible implementation, the transceiver unit is specifically configured to:
  send or receive the first data on the resource other than the at least one time domain symbol on the first resource, and send or receive the control information on the second resource, when the first resource and the second resource overlap in the at least one time domain symbol, and a priority of the first data is lower than a priority of the second data.

In a possible implementation, the transceiver unit is specifically configured to:
  send or receive the first data on the first resource, and discard or skip receiving the control information in the at least one time domain symbol, when the first resource and the second resource overlap in the at least one time domain symbol, and the priority of the first data is higher than the priority of the second data.

In a possible implementation, the control information is hybrid automatic repeat request (HARQ) acknowledgement information or scheduling information indicating data transmission.

In a possible implementation, the first resource is located in a first resource pool, the second resource is located in a second resource pool, the second resource pool includes transmission resources that are for the control information and whose period is N, and the first resource pool does not include a transmission resource for sending the control information, or the first resource pool includes transmission resources that are for the control information and whose period is M, where M and N are positive integers, and M is greater than N.

In a possible implementation, the first resource and the second resource are located in a same frequency band, a same carrier, or a same bandwidth part.

In a possible implementation, the first resource and the second resource are located in a same slot, the second resource is located in the last K symbols in the slot in which the first resource is located, and K is a positive integer greater than or equal to 1.

In a possible implementation, the at least one time domain symbol is a symbol occupied by the control information; the at least one time domain symbol is a symbol occupied by the control information and a blank symbol used for sending or receiving the control information or used for switching between sending and receiving of the control information; or the at least one time domain symbol is a symbol occupied by the control information, a blank symbol used for switching between sending and receiving of the control information, and a symbol used for receiving automatic gain control.

In a possible implementation, the transceiver unit is further configured to:
  when the priority of the first data is the same as the priority of the second data, determine, based on first information, to send or receive the first data on the resource other than the at least one time domain symbol on the first resource, and determine to send or receive the control information on the second resource; or send or receive the first data on the first resource, and discard or skip receiving the control information in the at least one time domain symbol.

In a possible implementation, the transceiver unit is further configured to:
  send first indication information to a second device when sending the first data.

The first indication information is used to indicate the first device not to send the first data or to send the control information on the at least one time domain symbol on the first resource; or
  the first indication information is used to indicate the first device to send the first data or not to send the control information on the at least one time domain symbol on the first resource.

For technical effects achieved by the third aspect or the possible implementations of the third aspect, refer to the descriptions of the technical effects of the first aspect or the possible implementations of the first aspect.

According to a fourth aspect, an embodiment of this application provides a communication apparatus, including a processing unit and a transceiver unit.

The processing unit is configured to determine a first slot and at least two second slots, where the first slot and the at least two second slots completely or partially overlap in time domain, and frequency domain resources of the first slot and the at least two second slots are different; and the transceiver unit is configured to send or receive first information in the first slot based on sending/receiving states of the communication apparatus in the first slot and the at least two second slots, and send or receive second information in at least one second slot in the at least two second slots.

In a possible implementation, the transceiver unit is specifically configured to:

skip sending the first information in the last symbol in the first slot, and skip sending the second information in the last symbol in each second slot in the at least two second slots; or skip sending the first information in the last symbol in the first slot, and skip sending the second information in the last symbol in the last second slot in the at least two second slots, where transmit power in each second slot in the at least two second slots is the same or transmit power on each subcarrier in each second slot is the same.

In a possible implementation, the transceiver unit is specifically configured to:

skip receiving the first information in the first symbol in the first slot, and puncture the second information in the first K symbols in the first second slot in the at least two second slots, where the puncturing means not to receive data or a signal at a puncturing position or the puncturing means setting received data or a received signal to 0 in a decoder at the puncturing position, the puncturing position is the K symbols, and K is a positive integer not less than a ratio of a second subcarrier spacing to a first subcarrier spacing; or puncture the first information in an overlapping symbol of the first slot and the first symbol in each second slot in the at least two second slots, and puncture the second information in the first symbol in each second slot, where the puncturing means not to receive data or a signal at a puncturing position or the puncturing means setting received data or a received signal to 0 in a decoder at the puncturing position, and the puncturing position is the overlapping symbol.

In a possible implementation, the transceiver unit is specifically configured to:

when a first priority is higher than a second priority, send the first information and skip receiving the second information in the first slot; or when a first priority is lower than a second priority, discard the first information and receive the second information in the first slot.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

In a possible implementation, the sending/receiving state of the communication apparatus in the first slot is a sending state, and the sending/receiving state of the communication apparatus in the at least two second slots includes the sending state or a receiving state; the communication apparatus sends the second information in a first part of second slots in the at least two second slots, and receives the second information in a second part of second slots in the at least two second slots; and the transceiver unit is specifically configured to:

when a first priority is higher than a second priority, send the first information in the first slot, and send the second information in the first part of second slots; or when a first priority is lower than a second priority, send the first information in a symbol that is in the first slot and that does not overlap the first part of second slots, and send the second information in the first part of second slots and/or receive the second information in the second part of second slots.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

In a possible implementation, the transceiver unit is specifically configured to:

send the first information on a resource, on resources overlapping the first part of second slots, other than a symbol corresponding to a sending-receiving switching interval between the first part of second slots and the second part of second slots.

In a possible implementation, the sending/receiving state of the communication apparatus in the first slot is a receiving state, and the sending/receiving state of the communication apparatus in the at least two second slots includes a sending state or the receiving state; the communication apparatus sends the second information in a first part of second slots in the at least two second slots, and receives the second information in a second part of second slots in the at least two second slots; and the transceiver unit is specifically configured to:

when a first priority is higher than a second priority, receive the first information in the first slot, and receive the second information in the first part of second slots; or when a first priority is lower than a second priority, receive the first information in a symbol that is in the first slot and that does not overlap the first part of second slots, and send the second information in the first part of second slots and/or receive the second information in the second part of second slots.

The first priority is a priority of a resource pool, a bandwidth part, a first subcarrier spacing, or a carrier on which the first information is located, and the second priority is a priority of a resource pool, a bandwidth part, a second subcarrier spacing, or a carrier on which the second information is located; or the first priority is a priority of data corresponding to the first information, and the second priority is a priority of data corresponding to the second information; or the first priority is greater than a first threshold and/or the second priority is lower than a second threshold.

For technical effects achieved by the fourth aspect or the possible implementations of the fourth aspect, refer to the descriptions of the technical effects of the second aspect or the possible implementations of the second aspect.

It should be noted that the communication apparatus in the foregoing aspects may be a terminal device or a network device, or may be a chip applied to the terminal device or the network device, or another combination component or component that can implement a function of the terminal device or the network device. When the communication apparatus is a terminal device or a network device, the transceiver unit may be a transceiver, and may include an antenna, a radio frequency circuit, and the like. The processing module may be a processor, for example, a central processing unit (CPU). When the communication apparatus is a component having a function of the terminal device or the network device, the transceiver unit may be a radio frequency unit, and the processing module may be a processor. When the communication apparatus is a chip system, the transceiver unit may be an input/output interface of the chip system, and the processing module may be a processor of the chip system.

According to a fifth aspect, an embodiment of this application provides a communication apparatus. The communication apparatus includes a processor, configured to implement the method performed by the first device in the first aspect or the first device in the second aspect. The communication apparatus may further include a memory, configured to store program instructions and data. The memory is coupled to the processor, and the processor may invoke and execute the program instruction stored in the memory, to implement any method performed by the first device in the first aspect or the first device in the second aspect. The communication apparatus may further include a communication interface. The communication interface may be a transceiver in the communication apparatus. The transceiver is implemented, for example, by using an antenna, a feeder, and a codec in the communication apparatus. Alternatively, if the fifth communication apparatus is a chip disposed in a network device, the communication interface may be an input/output interface of the chip, for example, an input/output pin. The transceiver is used by the communication apparatus to communicate with another device. For example, the communication apparatus is a terminal apparatus.

According to a sixth aspect, an embodiment of this application provides a chip system. The chip system includes a processor, and may further include a memory, configured to implement the method performed by the first device in the first aspect or the second device in the second aspect. The chip system may include a chip, or may include a chip and another discrete component.

According to a seventh aspect, an embodiment of this application provides a communication system. The system includes the first device and the second device described in the first aspect, includes the first device and the second device described in the first aspect, or includes two communication apparatuses in the second aspect. One communication apparatus is configured to implement a function of the first device, and the other communication apparatus is configured to implement a function of the second device.

According to an eighth aspect, an embodiment of this application further provides a computer-readable storage medium, including instructions. When the instructions are run on a computer, the computer is enabled to perform the method performed by the first device in the first aspect or the first device in the second aspect.

According to a ninth aspect, an embodiment of this application further provides a computer program product, including instructions. When the product runs on a computer, the computer is enabled to perform the method performed by the first device in the first aspect or the first device in the second aspect.

For beneficial effects of the third aspect to the ninth aspect and the implementations thereof, refer to the descriptions of the beneficial effects of the method and the implementations of the first aspect or the method and the implementations of the second aspect.

DESCRIPTION OF EMBODIMENTS

Figure 1:
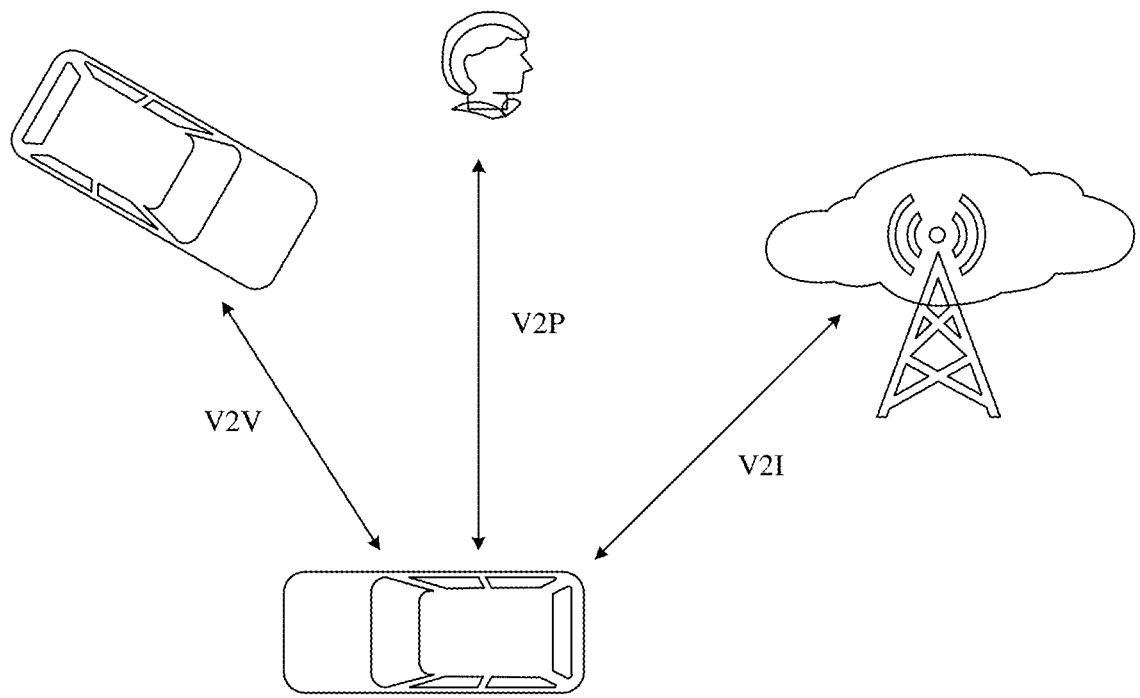
FIG. 1 is a schematic diagram of V2X according to an embodiment of this application.

To make objectives, technical solutions, and advantages of embodiments of this application clearer, the following further describes the embodiments of this application in detail with reference to accompanying drawings.

Before this application is described, some terms of the embodiments of this application are first briefly explained and described, to help a person skilled in the art have a better understanding.

(1) Terminal device: The terminal device may be a device that provides a user with voice and/or data connectivity, for example, may be a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, an aircraft (such as a drone, a hot air balloon, or a civil aviation passenger aircraft), user equipment (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may include a device such as a personal communications service (PCS) phone, a cordless phone, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement the method in this application.

(2) Network device: The network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an internet protocol (IP) packet and serve as a router between the terminal device and a rest part of the access network, where the rest part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in a long term evolution (LTE) system or long term evolution-advanced (LTE-A), may include a next generation NodeB (gNB) in a 5G NR system, or may include a centralized unit (CU) and a distributed unit (DU) in a cloud radio access network (Cloud RAN) system. This is not limited in the embodiments of this application.

(3) V2X: In Release (Rel)-14/15/16, the V2X is successfully initiated as a major application in a device-to-device (D2D) technology. On a basis of an existing D2D technology, a specific application requirement of the V2X is to be optimized in the V2X, to further reduce an access delay of a V2X device and resolve a resource conflict problem.

The V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction, as shown in FIG. 1. V2V refers to communication between vehicles. V2P refers to communication between a vehicle and a person (including a pedestrian, a bicycle rider, a driver, or a passenger). V2I refers to communication between a vehicle and a network device, for example, an RSU. In addition, another type of V2N may be included in the V2I. The V2N refers to communication between a vehicle and a base station/network.

The RSU includes two types: a terminal-type RSU and a base station-type RSU. Because the terminal-type RSU is deployed on a road side, the terminal-type RSU is in a non-mobile state, and mobility does not need to be considered. The base station-type RSU can provide timing synchronization and resource scheduling for a vehicle that communicates with the base station-type RSU.

(4) Subcarrier spacing (SCS): The subcarrier spacing is a value of a spacing between center positions or peak positions of two adjacent subcarriers in frequency domain in an OFDM system. In 5G NR, a plurality of subcarrier spacings are introduced. Different carriers may have different subcarrier spacings. A baseline is 15 kHz, and may be 15 kHz*2n, where n is an integer ranging from 3.75, 7.5, to 480 kHz. For example, for the subcarrier spacing, refer to the following Table 1.

TABLE 1

| $\mu$ | $\Delta f = 2^{\mu} \cdot 15$ [kHz] |
|---|---|
| 0 | 15 |
| 1 | 30 |
| 2 | 60 |
| 3 | 120 |
| 4 | 240 |

$\mu$ is used to indicate a subcarrier spacing. For example, when $\mu=0$, the subcarrier spacing is 15 kHz, and when $\mu=1$, the subcarrier spacing is 30 kHz. Lengths of slots corresponding to different subcarrier spacings are different. A length of a slot corresponding to a subcarrier spacing of 15 kHz is 0.5 ms, a length of a slot corresponding to a subcarrier spacing of 60 kHz is 0.125 ms, and the like. Correspondingly, one symbol corresponding to different subcarrier spacings may alternatively have different lengths.

In frequency domain, because a bandwidth of a 5G NR single carrier may reach 400 MHz, a bandwidth part (BWP) is defined in one carrier, and may also be referred to as a carrier bandwidth part. The BWP includes several consecutive resource units in frequency domain, for example, resource blocks (RBs). The bandwidth part may be a downlink bandwidth part or an uplink bandwidth part. The terminal device receives or sends data on a data channel in an activated bandwidth part.

(5) Time domain resource: The time domain resource may be a radio frame, a subframe, a slot, a mini-slot, or an orthogonal frequency division multiplexing (OFDM) symbol, or may be a resource aggregated by a plurality of radio frames, a plurality of subframes, a plurality of slots, a plurality of mini-slots, or a plurality of OFDM symbols. One radio frame may include a plurality of subframes, one subframe may include one or more slots, and one slot may include at least one symbol. Alternatively, one radio frame may include a plurality of slots, and one slot may include at least one symbol. It should be noted that in the embodiments of this application, one OFDM symbol may also be referred to as one symbol for short.

(6) Feedback information: The feedback information includes feedback information to be received by a first device and/or feedback information to be sent by the first device. The feedback information to be received by the first device is sent to the first device by another device, and the feedback information to be sent by the first device is sent to the another device by the first device. The another device may be another terminal device or a network device. Specific feedback information includes HARQ feedback information, and the like. In the following, data sent by the first device to a second device is referred to as first data, and feedback information sent by the first device to the second device is referred to as control information, and the control information is feedback information for data, for example, second data, that is previously sent by the second device to the first device. Therefore, the control information corresponds to the second data.

(7) Mapping: The mapping may also be described as "occupying" or "using". For example, that a communication system performs channel mapping on a carrier indicates that the communication system uses or occupies some or all time-frequency resources corresponding to the carrier to transmit information carried in the channel.

(8) Rate matching: The rate matching means that data is not mapped to symbols, which is typically used on a transmitter side. For a transmitter, the rate matching means that the transmitter performs channel coding on to-be-sent data based on an available physical resource that is actually provided, and then sends the encoded data on the available physical resource. If total resources are S1 and unusable resources are S2, available resources are (S1-S2). The rate matching means that channel coding is performed on to-be-transmitted data directly based on the (S1-S2) resources, and the data is mapped and sent to the (S1-S2) resources.

(9) Puncturing includes puncturing on the transmitter side and puncturing on a receiver side. For the transmitter, the puncturing means that the transmitter performs channel coding on to-be-sent data on the transmitter side based on total nominal transmit resources, and then sends the encoded data on available resources, and does not send a data part corresponding to unavailable resources. If total resources are S1 and unusable resources are S2, available resources are (S1-S2). That the transmitter performs puncturing means that the transmitter performs channel coding on to-be-transmitted data based on the S1 resources, and maps the data to the total S1 resources, but sends the data only on the (S1-S2) resources.

For the receiver side, only receive puncturing is performed. If the rate matching is performed on the transmitter side, the receiver receives only sent symbols. If the transmitter performs puncturing, the receiver also receives only sent symbols, but during decoding, the receiver sets data or signals corresponding to an unsent part in a decoder to 0 in the decoder.

During the rate matching on the transmitter side, a bit rate obtained after channel coding is generally higher than that obtained by puncturing. Moreover, no information bit loss is caused during the rate matching. However, puncturing is a manner of encoding and then knocking, and a corresponding information bit loss is caused.

Whether the puncturing or the rate matching is used on the transmitter side may be indicated by the receiver that sends data to the first device by using signaling, or may be determined according to a predefined rule.

(10) AGC operation or AGC symbol. AGC (Auto Gain Control, automatic gain control) is a control process in which the receiver controls a received signal within a proper range before data enters an analog-to-digital converter. Input signals with a specific duration are required to implement the AGC. Therefore, usually, a symbol or a sampling point with a specific duration may be used for AGC training. A symbol used for AGC training is referred to as an AGC symbol, and a symbol for AGC may be a symbol used to transmit data, or may be a symbol used to send a reference signal. This is not limited in the present invention. It should be noted that, once a symbol is used for an AGC operation, distortion occurs on the symbol or sampling point that has been used for AGC. Therefore, the receiver cannot directly use AGC symbols for reception and demodulation.

(11) Blank symbol, also referred to as a GAP symbol. In a transmission process, especially in a TDD system or on a carrier, UE cannot perform sending concurrent with receiving, and cannot perform receiving concurrent with sending. Further, due to an influence of a TDD duplexer, when the UE switches from a sending state to a receiving state, or switches from a receiving state to a sending state, some duplexer switching time is required. During system design, a specific duration is usually reserved, for example, a quantity of symbols at a specific subcarrier spacing are reserved. For example, a symbol is reserved as a blank symbol for switching from receiving to sending or switching from sending to receiving. In this blank symbol, the communication device usually neither transmits nor receives anything.

(12) The terms "system" and "network" may be used interchangeably in the embodiments of this application. "A plurality of" means two or more. In view of this, "a plurality of" in the present disclosure may also be understood as "at least two". "At least one" may be understood as one or more, for example, understood as one, two, or more. For example, including at least one means including one, two, or more, and does not limit which is included. For example, including at least one of A, B, and C may represent the following cases: A is included, B is included, C is included, A and B are included, A and C are included, B and C are included, or A, B, and C are included. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified.

Unless otherwise stated, in the embodiments of this application, ordinal numbers such as "first" and "second" are intended to distinguish between a plurality of objects, and not intended to limit a sequence, a time sequence, a priority, or importance of the plurality of objects. For example, the first device and the second device are only used to distinguish between different devices, but are not used to limit functions, priorities, or importance degrees of two devices.

The foregoing describes some concepts in the embodiments of this application. The following describes technical features in the embodiments of this application.

V2X is a key technology for a future intelligent transportation system. It implements communication between a vehicle and a vehicle, between a vehicle and a base station, and between a base station and a base station. In this way, a series of traffic information such as a real-time road condition, road information, and pedestrian information can be obtained. This improves driving safety, reduces congestion, improves traffic efficiency, provides in-vehicle infotainment information, and the like.

Figure 2:
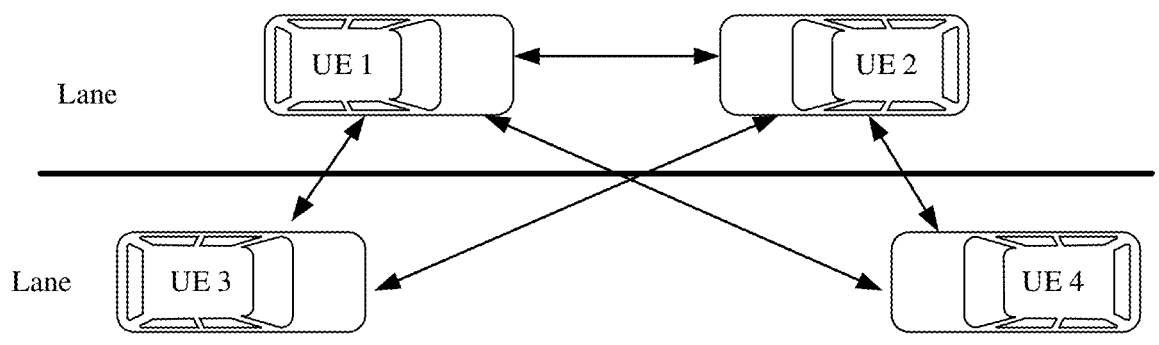
FIG. 2 is a schematic diagram of a network architecture of V2X according to an embodiment of this application.

FIG. 2 is a schematic diagram of a V2X network architecture. FIG. 2 includes four terminal devices. The four terminals are UE 1, UE 2, UE 3, and UE 4. UE 1 and UE 2 are located in a same lane, and UE 3 and UE 4 are located in a same lane. Any terminal device in the four terminal devices may communicate with the remaining three terminal devices through a V2X link which may also be referred to as a sidelink. The terminal devices in FIG. 2 use vehicle-mounted terminal devices as an example, but an actual application is not limited thereto. Certainly, the quantity of terminal devices in FIG. 2 is merely an example.

In a V2X technology, to improve transmission reliability, it is agreed by 3GPP that a PSFCH is defined in the scope of sidelinks, used to send SFCI, and at least used by a receive end to feed back an ACK, a NACK, or the like to a transmit end. In a possible scenario, one UE may simultaneously communicate with a plurality of UEs. In this case, one UE may receive data sent by the plurality of UEs. Correspondingly, the UE needs to perform feedback to the plurality of data transmissions. If a plurality of data channel time domain resources correspond to one PSFCH time domain resource, one UE may also send data on the plurality of data channel time domain resources, and a corresponding receive UE needs to perform feedback to the plurality of data channel transmissions. 3GPP agrees that periodic PSFCH resources are configured for SFCI transmission. A value of a periodicity of the PSFCH may be 1, 2, or 4. Optionally, the periodicity of the PSFCH is a sending interval of two PSFCH resources. To ensure communication performance, each UE transmits data or feedback information on a resource corresponding to the UE, which may inevitably cause a resource conflict.

The following describes the foregoing scenario by using an example in which three UEs send data and/or feedback information in a resource pool.

Figure 3:
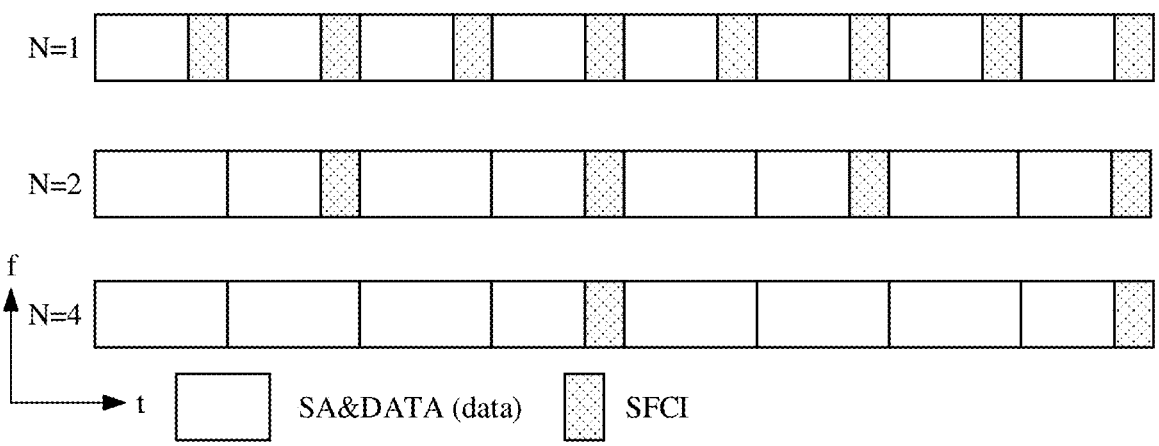
FIG. 3 is a schematic diagram of periodically configured PUSCH resources.

FIG. 3 is a schematic diagram of periodically configured PSFCH resources. A horizontal coordinate in FIG. 3 represents time domain, a vertical coordinate represents frequency domain, and N represents a periodicity of the PSFCH. It can be learned from FIG. 3 that, when N=1, a PSFCH resource is configured in each slot, when N=2, a PSFCH resource is configured in the $2^{nd}$ slot of every two slots, when N=4, a PSFCH resource is configured in the $4^{th}$ slot of every four slots. In addition, as shown in FIG. 3, the PSFCH resource occupies several symbols in the rear of each slot. The PSFCH resource is used to transmit the SFCI, and a resource other than the PSFCH resource in each slot is used to transmit data (DATA) and/or control signaling, for example, scheduling assignment (SA). This is used as an example in FIG. 3.

In an example, it is assumed that UE 1 sends data or feedback information to different UE 2 and UE 3, and receives data or feedback information from UE 2 and UE 3. For example, when UE 1 sends data to UE 2, and UE 1 sends feedback information to UE 3, UE 1 may send the data on corresponding resources when N=1, 2, and 4, or UE 1 may send the feedback information on corresponding resources when N=1, 2, and 4, if a moment at which UE 1 sends the data to UE 2 is the same as a moment at which UE 1 sends the feedback information to UE 3. One UE has only one PSFCH to be transmitted in one slot. Therefore, if UE 1 sends the feedback information to UE 3 on a resource when N=1, a conflict exists when UE 1 sends the data on a resource when N=2 or 4. That is, when UE 1 sends data, a resource to be occupied for sending the data conflicts with a resource occupied for feeding back information.

Similarly, when UE 1 sends data to UE 2 or UE 3, and receives feedback information from UE 2 or UE 3, a resource to be occupied for sending the data may conflict with a resource to be occupied for receiving the feedback information. Alternatively, when UE 1 receives data from UE 2 or UE 3, and UE 1 sends feedback information to UE 2 or UE 3, a resource to be occupied for receiving the data may conflict with a resource to be occupied for sending the feedback information. Alternatively, when UE 1 receives data from UE 2 or UE 3, and UE 1 receives feedback information from UE 2 or UE 3, a resource to be occupied for receiving the data may conflict with a resource to be occupied for receiving the feedback information. It can be learned that a resource currently used for data transmission may conflict with a resource used for feedback information transmission.

It should be noted that, in the resources shown in FIG. 3, for example, resources used to transmit data are located in a resource pool, for example, a first resource pool, resources used to transmit feedback information are located in a resource pool, for example, a second resource pool, the second resource pool includes PSFCHs whose periodicity is N, and the first resource pool includes PSFCHs whose periodicity is greater than N. However, in actual application, the resources used to transmit the data and the resources used to transmit the feedback information may be located in a same frequency band, or may be located on a same carrier or located in a same bandwidth part, provided that the resources used to transmit the data and the resources used to transmit the feedback information have an overlapping resource. The resources shown in FIG. 3 are merely used as an example, and should not be understood as a limitation on the resources used to transmit the data and the resources used to transmit the feedback information. This part of content is described in detail in the following corresponding embodiments.

It can be learned from the foregoing content that, currently, resources used for data transmission may conflict with resources used for feedback information transmission.

However, if the resources used for data transmission conflicts with the resources used for feedback information transmission, reliability of the data transmission and the feedback information transmission cannot be ensured.

In view of this, the technical solutions in the embodiments of this application are provided. In the embodiments of this application, when a first device determines that a first resource used to send or receive first data overlaps a second resource used to send or receive control information, the first device may determine how to send or receive the first data on the first resource. For example, the first device sends or receives the first data on a resource other than an overlapping resource on the first resource, or the first device may determine to send or receive the first data and discard or skip receiving the control information on the first resource. In other words, a solution of how the first device transmits the first data and/or the control information is provided, so that reliability of transmission of the data and/or the control information can be ensured.

The technical solutions provided in the embodiments of this application may be applied to a 5G system, or applied to a future communication system or another similar communication system. In addition, the technical solutions provided in the embodiments of this application may be applied to a cellular link, or may be applied to a link between devices, for example, a device to device (D2D) link. A D2D link may also be referred to as a sidelink, where the sidelink may also be referred to as a side link, a secondary link, or the like. In the embodiments of this application, the foregoing terms all refer to links established between devices of a same type, and have a same meaning. The link established between devices of a same type may be a link between terminal devices, a link between base stations, a link between relay nodes, or the like. This is not limited in the embodiments of this application. For the link between the terminal devices, there is a D2D link defined in 3GPP Release (Rel)-12/13, and there is also a V2X link, defined by 3GPP for internet of vehicles, from a vehicle to a vehicle, a vehicle to a mobile phone, or a vehicle to any entity. The V2X link includes a V2X link in Rel-14/15, and further includes, for example, a V2X link based on an NR system in Rel-16 and subsequent releases which are currently being researched by 3GPP.

Figure 4:
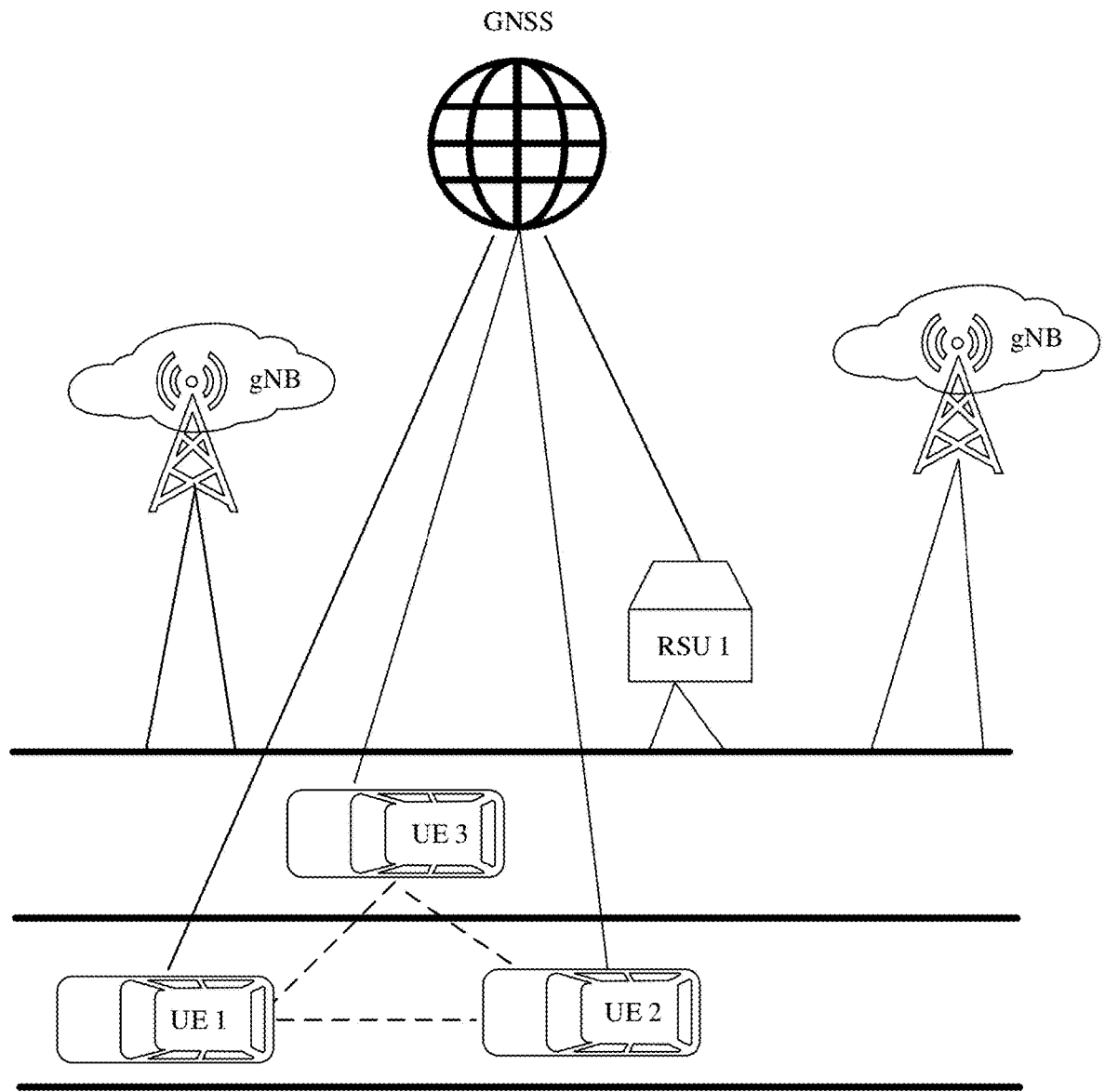
FIG. 4 is a schematic diagram of a network architecture of V2X according to an embodiment of this application.

The following describes a network architecture to which an embodiment of this application is applied. FIG. 4 shows a network architecture to which the embodiments of this application are applied.

FIG. 4 includes three terminal devices and four network devices. The three terminal devices are UE 1, UE 2, and UE 3, and the four network devices are two base stations, one RUS, and one global navigation satellite system (GNSS). In FIG. 3, for example, all the three terminal devices are V2X terminal devices. The network devices correspond to different devices in different systems. For example, the network device may correspond to an eNB in a 4th generation (4G) mobile communication technology system, and may correspond to a gNB in 5G in a 5G system. A V2X terminal device may also be referred to as a vehicle-mounted device. Vehicle-mounted devices may communicate with each other to exchange and share information such as vehicle status information including a vehicle location and a driving speed, to determine vehicle traffic on a road. The RSU may communicate with each vehicle-mounted device and/or base station device, and may further be configured to detect a road surface condition and guide the vehicle to select an optimal driving route. The base station communicates with each vehicle-mounted device and/or the RSU, and the GNSS may provide positioning and time serving information for another network element. In addition, the vehicle-mounted device in the Internet of Vehicles may further communicate with a person. Specifically, a user may perform information communication with a vehicle by using a wireless communication means such as Wi-Fi, Bluetooth, or cellular, so that the user can monitor and control the vehicle by using a corresponding mobile terminal device. The three UEs and the RUS may be covered by two base stations, and each base station may communicate with the three UEs and the RUS. The base station in FIG. 4 is optional. If there is a base station, it is a scenario with network coverage. If there is no base station device, it is a scenario without network coverage. It should be noted that the quantity of terminal devices in FIG. 4 is merely an example. In actual application, the network device may provide services for a plurality of terminal devices. The terminal device in FIG. 4 may be a V2X terminal device, for example, a vehicle-mounted terminal device or a vehicle. However, the terminal device in the embodiments of this application is not limited thereto.

The foregoing devices may communicate with each other by using a sidelink and an uplink/a downlink. During communication, a spectrum of a cellular link may be used, or an intelligent transportation spectrum near 5.9 GHZ may be used. A technology for mutual communication between devices may be enhanced based on a communication network protocol (for example, an LTE protocol), or may be enhanced based on a D2D technology.

The following describes, with reference to the accompanying drawings, the technical solutions provided in the embodiments of this application.

Figure 5:
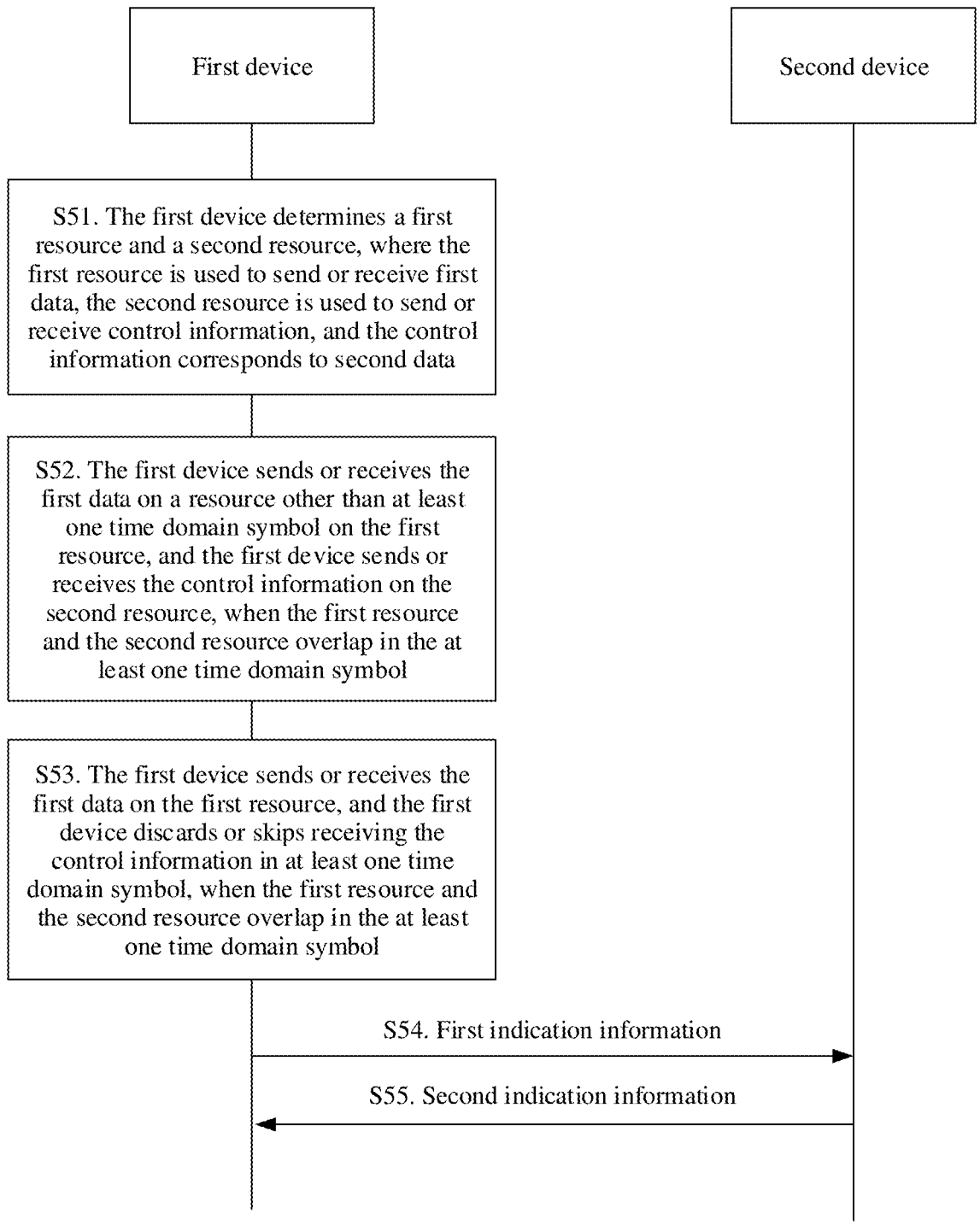
FIG. 5 is a schematic flowchart of a communication method according to an embodiment of this application.

An embodiment of this application provides a communication method. FIG. 5 is a flowchart of a communication method according to an embodiment of this application. The following provides a description by using an example in which the method is used in the network architecture shown in FIG. 2 or FIG. 4. In addition, the method may be performed by two communication apparatuses. The two communication apparatuses are, for example, a first communication apparatus and a second communication apparatus. The first communication apparatus may be a terminal device or a network device, or a communication apparatus that can support the terminal device or the network device in implementing a function required by the method. Alternatively, the first communication apparatus may be a communication chip (for example, a communication baseband chip system) that can support the terminal device or the network device in implementing a function required by the method. It is the same case for the second communication apparatus. The second communication apparatus may be a terminal device or a network device, or a communication apparatus that can support the terminal device or the network device in implementing a function required by the method. Alternatively, the second communication apparatus may be a communication chip (for example, a baseband communication chip system) that can support the terminal device or the network device in implementing a function required by the method.

For ease of description, in the following description, the first communication apparatus and the second communication apparatus are also referred to as a first device and a second device. In other words, an example in which the first communication apparatus is the first device and the second communication apparatus is the second device is used. For example, in the following description, the first device may be the UE in FIG. 2 or FIG. 4, and the second device may also be the UE in FIG. 2 or FIG. 4. For example, the method is applied to the network architecture shown in FIG. 2. The first device may be any one of UE 1 to UE 4, and the second device may be any one of UE 1 to UE 4 except the first device. For another example, the method is applied to the network architecture shown in FIG. 4. The first device may be any one of UE 1 to UE 3, and the second device may be any one of UE 1 to UE 3 except the first device, or may be RSU 1. Alternatively, the first device may be RSU 1, and the second device may be any one of UE 1 to UE 3. Implementations of the first device and the second device are not limited in embodiments of this application. It should be noted that, that the communication method is performed by using the first device and the second device is only used as an example, and this embodiment is not limited to this scenario.

S51. The first device determines a first resource and a second resource, where the first resource is used to send or receive first data, the second resource is used to send or receive control information, and the control information corresponds to second data.

In this embodiment, the first resource may be a resource used to send the first data, or may be a resource used to receive the first data. Correspondingly, the second resource may be a resource used to send the control information, or may be a resource used to receive the control information. For example, the first device may send the first data to the second device or receive the first data from the second device on the first resource. The first device may send the control information to the second device or receive the control information from the second device on the second resource. The control information herein may be, for example, HARQ acknowledgement information, or scheduling information indicating data transmission. The HARQ acknowledgement information may be understood as information fed back by one terminal device for data sent by another terminal device, and may also be referred to as feedback information. For ease of description, in the following description, data sent by the first device to the second device is referred to as the first data, data sent by the second device to the first device is referred to as the second data, and feedback information sent by the first device to the second device for the second data is referred to as the control information. That is, the control information corresponds to the second data.

In an example, the first resource may be located in a first resource pool, and the second resource may be located in a second resource pool. The first resource pool may be configured by a network device for the first device, and the second resource pool may be configured by the network device for the second device. Alternatively, the network device configures a plurality of resource pools, the first device may select the first resource pool from the plurality of resource pools, and the second device may select the second resource pool from the plurality of resource pools. Each resource pool may be a resource set including a time domain resource and a frequency domain resource. The first device and the second device may perform V2X communication by using a time-frequency resource in the resource pool.

In the first resource pool, feedback resources with different periodicities may be configured for transmitting the control information. In the second resource pool, feedback resources with different periodicities may also be configured for transmitting the control information. For example, the first resource pool includes transmission resources that are used for the control information and whose periodicity is M, and the second resource pool includes transmission resources that are used for the control information and whose periodicity is N. M and N are positive integers, and M is greater than N. For example, M=4, N=2 or 1, or M=2, and N=1. In this case, as shown in FIG. 3, a resource used to transmit data may conflict with a resource used to transmit control information. For example, the resource used to transmit the data when M=2 and N=1 and the resource used to transmit the control information when N=1 overlap in time domain, and the overlapping resource is a resource occupied for transmitting the control information when N=1. In this case, reliability of transmission of the data and the control information cannot be ensured.

Figure 6:
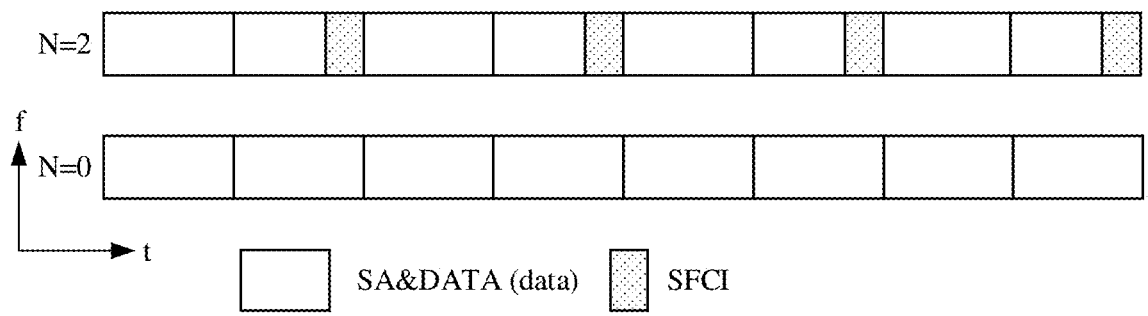
FIG. 6 to FIG. 10 are schematic diagrams of a first resource pool and a second resource pool according to an embodiment of this application.

For another example, FIG. 6 is a schematic diagram of the first resource and the second resource. The first resource pool does not include a transmission resource for the control information, that is, all resources in the first resource pool are used to transmit the data. The second resource pool includes transmission resources that are used for the control information and whose periodicity is N. N is a positive integer, and N=2 is used as an example in FIG. 6. The overlapping resource of the first resource and the second resource is a symbol used to transmit the control information when N=2.

In another example, the first resource and the second resource are located in a same frequency band, a same carrier, or a same bandwidth part.

In still another example, the first resource pool and the second resource pool are located on a same carrier or bandwidth part. Alternatively, the first resource pool is located on a first carrier, the second resource pool is located in a second carrier pool, and the first carrier and the second carrier belong to a same frequency band. Alternatively, the first resource pool is located in a first bandwidth part, the second resource is located in a second bandwidth part, and the first bandwidth part and the second bandwidth part are located on a same carrier or on different carriers in a same frequency band.

Figure 7:
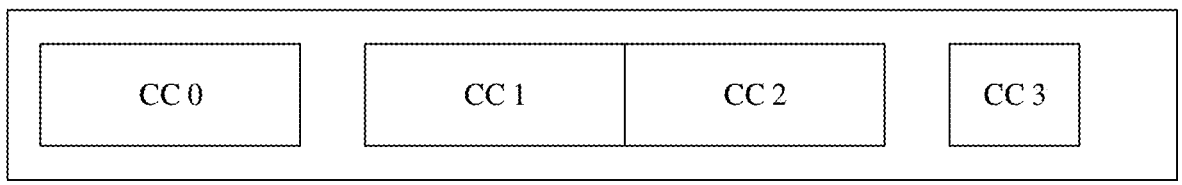

For example, FIG. 7 is a schematic diagram of the first resource and the second resource. FIG. 7 shows a frequency band. For example, frequency band 47 (with a bandwidth of 5855 MHz to 5925 MHz) includes four carriers, and the four carriers are CC 0, CC 1, CC 2, and CC 3. Carriers in a same frequency band may be adjacent in frequency domain, for example, CC 1 and CC 2. Carriers in a same frequency band may not be adjacent, for example, CC 0, CC 1, and CC 3. Carriers in a same frequency band may have a same size, for example, CC 0, CC 1, and CC 2. Carriers in a same frequency band may have different sizes, for example, CC 3.

Figure 8:
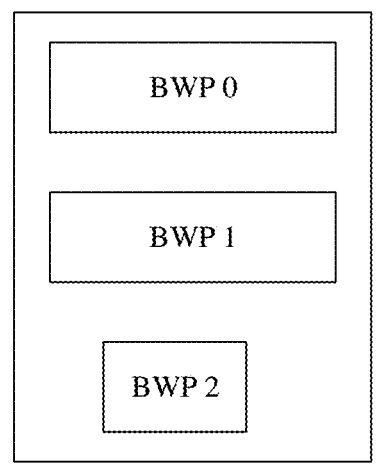

Further, referring to FIG. 8, one carrier may further include a plurality of BWPs. A carrier CC 0 shown in FIG. 8 includes three BWPs, and the three BWPs are BWP 0, BWP 1, and BWP 2.

Figure 9:
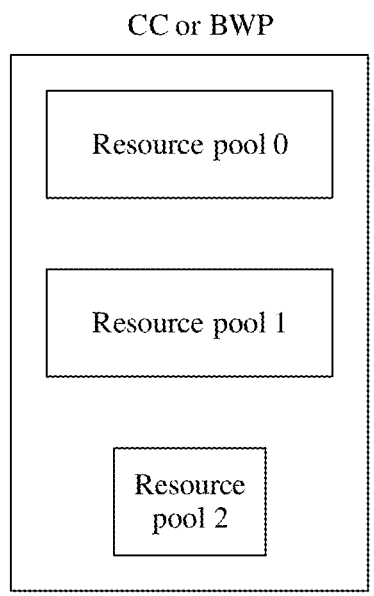

Further, referring to FIG. 9, each BWP or carrier may further include a plurality of resource pools. As shown in FIG. 9, one carrier or BWP includes three resource pools: resource pool 1, resource pool 2, and resource pool 3.

Alternatively, in still another example, the first resource and the second resource are located in a same slot, the second resource is located in the last K symbols in the slot in which the first resource is located, and K is a positive integer greater than or equal to 1.

Figure 10:
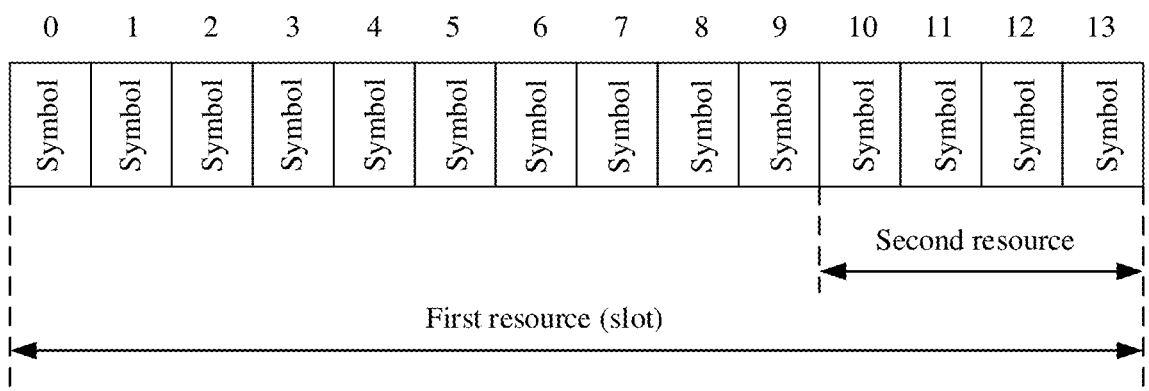

For example, FIG. 10 is a schematic diagram of the first resource and the second resource. In FIG. 10, one slot is used as an example. The slot includes 14 symbols, and K=4. The 14 symbols in FIG. 10 start with symbol 0 and end with symbol 13. The second resource is a total of four symbols from symbol 10 to symbol 13, and the first resource is the 14 symbols.

It can be learned from FIG. 6 to FIG. 10 that the first resource and the second resource overlap in at least one time domain symbol. In this case, when the first device performs V2X communication with the second device, the reliability of the transmission of the data and the control information between the first device and the second device cannot be ensured.

It should be noted that, for example, the at least one time domain symbol is a symbol occupied by the control information. However, in actual application, in addition to the symbol occupied by the control information, the at least one time domain symbol may further include a blank symbol used for switching from receiving to sending of the control information, or may further include a blank symbol for switching from sending to receiving of the control information. Alternatively, in addition to the symbol occupied by the control information, the blank symbol used for switching from sending to receiving of the control information, and the blank symbol used for switching from receiving to sending of the control information, the at least one time domain symbol may further include a symbol used for receiving automatic gain control (AGC).

S52. The first device sends or receives the first data on a resource other than the at least one time domain symbol on the first resource, and the first device sends or receives the control information on the second resource, when the first resource and the second resource overlap in the at least one time domain symbol.

S53. The first device sends or receives the first data on the first resource, and the first device discards or skips receiving the control information in the at least one time domain symbol, when the first resource and the second resource overlap in the at least one time domain symbol.

It should be noted that S52 and S53 are two manners of transmitting the first data and/or first information, and are irrelevant to an execution sequence. The execution sequence of S52 and S53 is not limited in this embodiment.

When determining that the first resource and the second resource overlap in the at least one time domain symbol, the first device may send or receive the first data on the first resource and send or receive the control information on the second resource according to a preset rule. For example, in S52, that the first device sends or receives the first data on a resource other than the at least one time domain symbol on the first resource, and the first device sends or receives the control information on the second resource may be understood as a preset rule. In S53, that the first device sends or receives the first data on the first resource, and the first device discards or skips receiving the control information in the at least one time domain symbol may be understood as another preset rule.

For ease of understanding, the following describes several possible preset rules by using different combinations of receiving and sending of the first data and the control information between the first device and the second device as an example.

Case 1: The first device sends the first data to the second device on the first resource, and the first device sends the control information to the second device on the second resource.

In some embodiments, when the first resource and the second resource overlap in the at least one time domain symbol, the first device may preferentially send the first data on the first resource, or the first device may preferentially send the control information on the first resource. Herein, that the first device preferentially sends the first data on the first resource may be considered as a first preset rule. Correspondingly, that the first device preferentially sends the control information on the first resource may be considered as a second preset rule. When the first device uses the first preset rule or the second preset rule may be agreed upon in advance by the first device and the second device. Alternatively, the second device may indicate a preset rule to be used by the first device.

Figure 11:
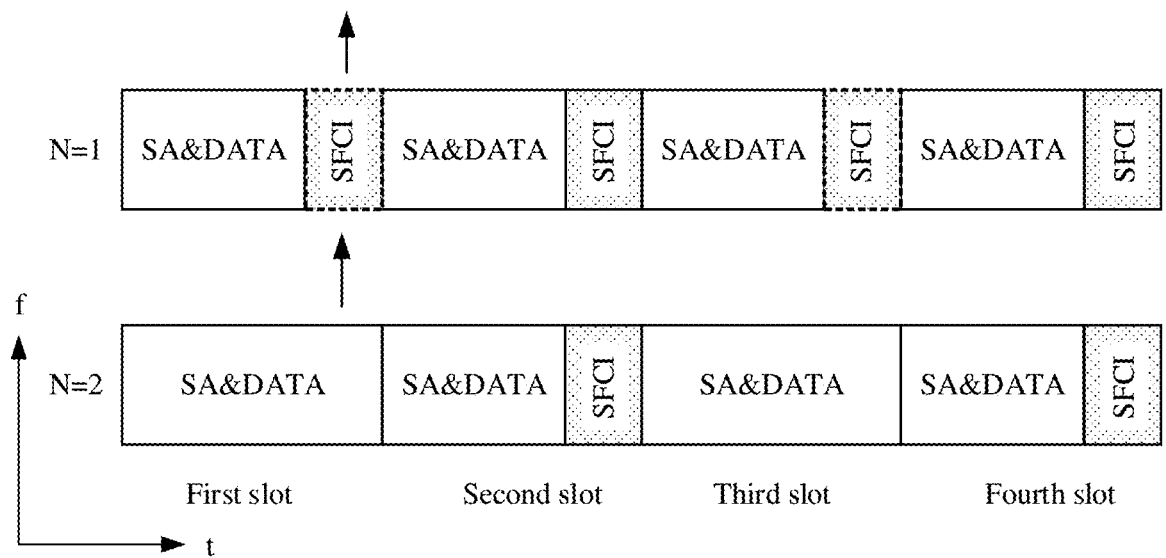
FIG. 11 to FIG. 19 are schematic diagrams of transmitting data and/or control information by a first device on a first resource and a second resource according to an embodiment of this application.

For example, FIG. 11 is a schematic diagram of the first resource and the second resource. In FIG. 11, for example, the first resource and the second resource include four slots, and the four slots are sequentially a first slot to a fourth slot. PSFCH resources whose periodicity is 2 is configured on the first resource, and PSFCH resources whose periodicity is 1 is configured on the second resource. The first device determines that the first resource overlaps the second resource. For example, in the first slot and the third slot, at least one symbol occupied by the PSFCH resources overlaps. In FIG. 11, an arrow direction indicates a transmission direction of the first data and the control information. In FIG. 11 and the following description, an upward arrow indicates sending, and a downward arrow indicates receiving.

In this case, the first device may determine that sending the first data in the at least one symbol conflicts with sending the control information in the at least one symbol. In this case, the first device may preferentially send the first data, and the first device discards the control information in the at least one time domain symbol, or in other words, the first device does not send the control information. That is, the first device sends only the first data, but does not send the control information on resources available for sending the control information, that is, on the PSFCH resources in the first slot and the third slot. For example, in FIG. 11, resources in the first slot and the third slot are shown by using solid lines, and the PSFCH resources in the first slot and the third slot are shown by using dashed lines, indicating that the first data is preferentially sent, and the control information is not sent.

Figure 12:
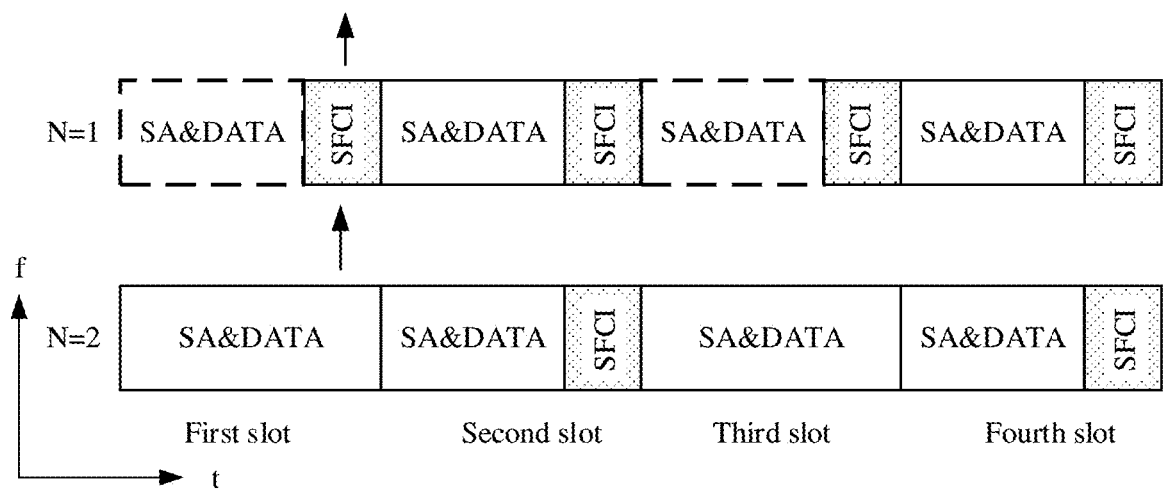

Alternatively, in this case, the first device may preferentially send the control information, and send the first data on the resource other than the at least one time domain symbol on the first resource. For example, refer to FIG. 12. FIG. 12 is similar to FIG. 11, and a difference lies in that the PSFCH resources in the first slot and the third slot in FIG. 12 are shown by using solid lines, indicating that the control information is sent, but the resources other than the PSFCH resources in the first slot and the third slot are indicated by using dashed lines, indicating that the control information is preferentially sent.

That the first device sends the first data on the resource other than the at least one time domain symbol on the first resource may also be considered as: when sending the first data on the first resource, the first device performs rate matching on the first data, that is, when sending the first data, the first device does not map the first data to the at least one time domain symbol.

It should be noted that in FIG. 12, only an example in which N corresponding to the first resource is 2, and N corresponding to the second resource is 1 is used. Actually, a periodicity, M, corresponding to the first resource is greater than a periodicity, N, corresponding to the second resource. For example, both M=4 and N=1 are applicable. When sending the first data on the first resource, the first device may perform rate matching based on at least one time domain symbol corresponding to a minimum N value on the first resource or a resource that is in blind transmission resources without feedback and on which no feedback resource is configured, to ensure reliability of transmission of the first data and the control information.

In some other embodiments, when determining that the first resource and the second resource overlap in the at least one time domain symbol, the first device may determine, based on a priority of the first data and a priority of the second data, whether to preferentially send the first data or the control information.

For example, if the priority of the first data is higher than the priority of the second data, the first device determines to use the first preset rule, that is, to send the first data on the first resource, and discard the control information in the at least one time domain symbol. This is also referred to as a third preset rule. That is, data of a high priority is preferentially processed, that is, transmission of important data is preferentially ensured, and an impact on a to-be-performed communication service is reduced.

For another example, if the priority of the first data is lower than the priority of the second data, the first device determines to use the second preset rule, that is, to send the first data on the resource other than the at least one time domain symbol on the first resource, and send the control information on the second resource. This is also referred to as a fourth preset rule. If the priority of the first data is low, transmission of the second data may be preferentially ensured, that is, while transmission of important data may be preferentially ensured, the first data may be further sent, thereby improving resource utilization.

In still some embodiments, if the priority of the first data is the same as the priority of the second data, the first device may determine, based on the first information, whether to use the first preset rule or the second preset rule. This is also referred to as a fifth preset rule. The first information may be information indicating a time margin of the first data. Alternatively, the first information may be information indicating a sending manner of the first data, for example, indicating that the sending manner of the first data is broadcast. Alternatively, the first information may be information indicating that the first data is blindly transmitted data. This is not enumerated herein. For example, the first device may determine, based on the first information, not to preferentially send first data with a large time margin, or not to preferentially send blindly transmitted first data, or not to preferentially send first data whose sending manner is broadcast.

The first device may determine, based on any one or more types of the first information, to use the first preset rule or the second preset rule, to determine a solution for transmitting the data and/or the control information. Further, for example, a communication service that has a short time margin and that can better match a low latency may be preferentially sent. For another example, it is preferentially ensured that data whose sending manner is broadcast is sent, so as to ensure that as many second devices as possible receive the data, thereby reducing a quantity of data retransmission times, and improving data transmission efficiency. For another example, it can be preferentially ensured that data whose sending manner is unicast is received, so as to improve a success rate of receiving the data by the second device.

According to the first preset rule to the fifth preset rule, when it is determined that the first resource and the second resource overlap in the at least one symbol, how to transmit the first data and/or the control information, for example, preferentially ensure transmission of the control information, or determine, based on a priority of the data and a priority of data corresponding to the control information, to preferentially ensure transmission of the control information can be determined. This can avoid a possible conflict caused by concurrent sending of the data and the control information, and ensure reliability of transmission of the first data and/or the control information as much as possible.

In this embodiment, the priority of the first data and the priority of the second data may have a plurality of implementation forms. For example, in an implementation form, the priority of the first data is a priority of the first data, and correspondingly the priority of the second data is a priority of the second data. In a possible implementation, the priority of the first data may be determined based on a service type of the first data, and the priority of the second data may be determined based on a service type of the second data. Alternatively, the priority of the first data may be indicated by the first device to the second device by using indication information. For example, the indication information carries a number of the priority of the first data. Correspondingly, the second device may also indicate the priority of the second data to the first device by using indication information. Similarly, the indication information may carry a number of the priority of the second data.

In another implementation form, the priority of the first data is a priority of a resource pool, a bandwidth part, a first subcarrier spacing, or a carrier on which the first data is located, and correspondingly the priority of the second data is a priority of a resource pool, a bandwidth part, a second subcarrier spacing, or a carrier on which the second data is located. The priority of the resource pool, the bandwidth part, the first subcarrier spacing, or the carrier may be configured by signaling or preconfigured. For example, if a priority of resource pool 1 is higher than a priority of resource pool 2, a priority of data sent in resource pool 1 is higher than that of data sent in resource pool 2, regardless of the type of the data. Descriptions of other bandwidth parts or carriers are similar to the description of the resource pools. For the subcarrier spacing, data using a subcarrier spacing with a higher priority has a higher priority. For example, a priority of a service using 60 kHz is higher than a priority of a service using 15 kHz.

In still another implementation form, the priority of the first data is greater than a first threshold.

Herein, the first threshold may be a preset threshold level, for example, 5, indicating that a priority level is 5. In this form, the priority of the second data is not concerned.

In still another implementation form, the priority of the second data is lower than a second threshold.

Herein, the second threshold may be a preset threshold level, for example, 3, indicating that a priority level is 3. In this form, the priority of the first data is not concerned.

In still another implementation form, the priority of the first data is greater than a first threshold, and the priority of the second data is lower than a second threshold.

In this form, both the priority of the first data and the priority of the second data need to be determined based on a preset first threshold and a preset second threshold.

In the foregoing description, a plurality of specific implementation forms of the priority of the first data and the priority of the second data are enumerated, so that the priority of the first data and the priority of the second data can be compared from a plurality of perspectives, which is flexible.

S54. The first device sends first indication information to the second device, so that the second device receives the first indication information.

The first indication information herein may be used to indicate whether rate matching is performed on the first data when the first device sends the first data.

When sending the first data to the second device, the first device may have performed the rate matching on the first data, and may send all of the first data. However, the second device does not know whether the first device sends all of the first data or first data on which the rate matching has been performed. To ensure that the second device correctly receives the first data sent by the first device, in some embodiments, when sending the first data, the first device may further notify the second device whether the sent first data is all of the first data or the first data on which the rate matching has been performed.

For example, if the first device sends the first data to the second device, the first device may notify, by using the first indication information, the second device whether the first data sent by the first device is all of the first data or the first data on which the rate matching has been performed. Specifically, the first device may send the first indication information to the second device, so that the second device receives the first indication information. The first indication information may be used to indicate the first device not to send the first data or to send the control information on the resource other than the at least one time domain symbol on the first resource. Alternatively, the first indication information may be used to indicate the first device to send the first data or not to send the control information on the resource other than the at least one time domain symbol on the first resource.

In an implementation of the first indication information, the first indication information may be carried in SCI for representation. For example, the first indication information may be carried in a field of the SCI. For ease of description, in this embodiment, the field is referred to as a first field. The first field may be a defined field in the SCI or a newly defined field. The first field may occupy one bit. When a value of the first field is "0", it may indicate the first device not to send the first data on the at least one time domain symbol on the first resource. Correspondingly, when a value of the first field is "1", it may indicate the first device to send the first data on the at least one time domain symbol on the first resource. In another embodiment, when a value of the first field is "1", it may indicate the first device not to send the first data on the at least one time domain symbol on the first resource. Correspondingly, when a value of the first field is "0", it may indicate the first device to send the first data on the at least one time domain symbol on the first resource. It should be noted that in the embodiments of this application, the value of the first field may also be understood as a value carried in the first field in some embodiments.

Alternatively, in some other embodiments, when a value of the first field is "0", it may indicate the first device to send the control information on the at least one time domain symbol on the first resource. Correspondingly, when a value of the first field is "1", it may indicate the first device not to send the control information on the at least one time domain symbol on the first resource. In some other embodiments, when a value of the first field is "1", it may indicate the first device not to send the control information on the at least one time domain symbol on the first resource. Correspondingly, when a value of the first field is "0", it may indicate the first device to send the control information on the at least one time domain symbol on the first resource.

S55. The first device receives second indication information from the second device, so that the first device receives the second indication information.

Similar to the first indication information, the second indication information may indicate whether the second device performs the rate matching on the first data when sending the first data to the first device. For example, if the second device sends the first data to the first device, the second device may notify, by using the second indication information, the first device whether the first data sent by the second device is all of the first data or the first data on which the rate matching has been performed.

A specific implementation of the second indication information is similar to a specific implementation of the first indication information. For details, refer to the implementation of the first indication information. Details are not described herein again.

In the foregoing technical solution, the first indication information or the second indication information may indicate, by using different values, solutions for transmitting the first data and/or the control information, which is simple and easy to implement.

It should be noted that there is no relationship between execution sequences of S54 and S55, and the execution sequences of S54 and S55 are not limited in this embodiment.

Case 2: The first device sends the first data to the second device on the first resource, and the first device receives the control information from the second device on the second resource.

Figure 13:
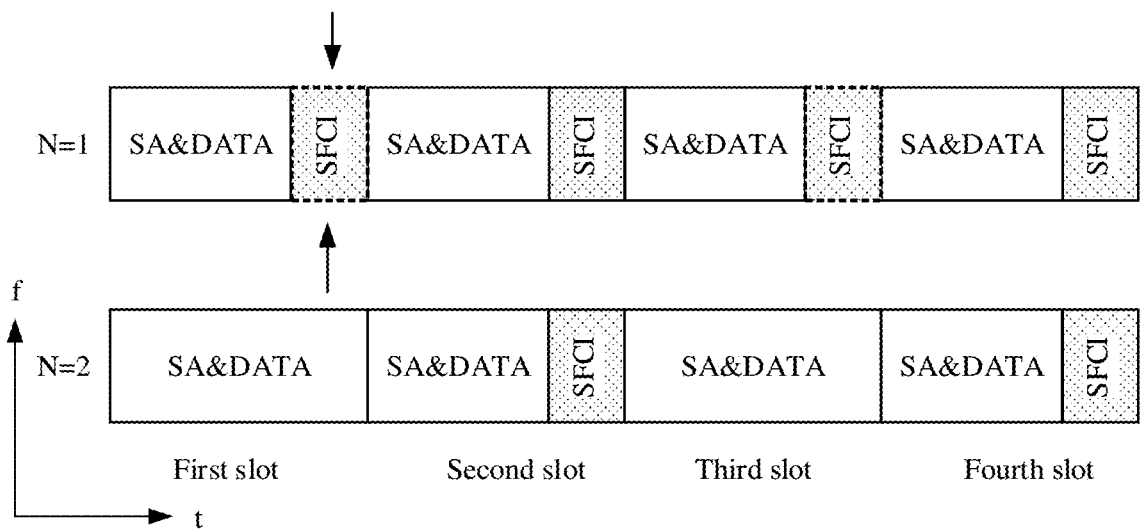

For example, FIG. 13 is a schematic diagram of the first resource and the second resource. FIG. 13 is similar to FIG. 11, and a difference lies in that, in FIG. 13, a direction of an arrow on the PSFCH resource is opposite to a direction of an arrow on the first resource, to indicate that the control information is received on the second resource.

In this case, the first device may determine that sending the first data in the at least one symbol conflicts with sending the control information in the at least one symbol. In this case, the first device determines to use a sixth preset rule, that is, the first device preferentially sends the first data, and the first device does not receive the control information in the at least one time domain symbol. That is, the first device sends only the first data, but does not receive the control information on resources available for receiving the control information, that is, on the PSFCH resources in the first slot and the third slot. For example, in FIG. 18, the PSFCH resources in the first slot and the third slot are shown by using dashed lines, indicating that the first data is preferentially sent.

Figure 14:
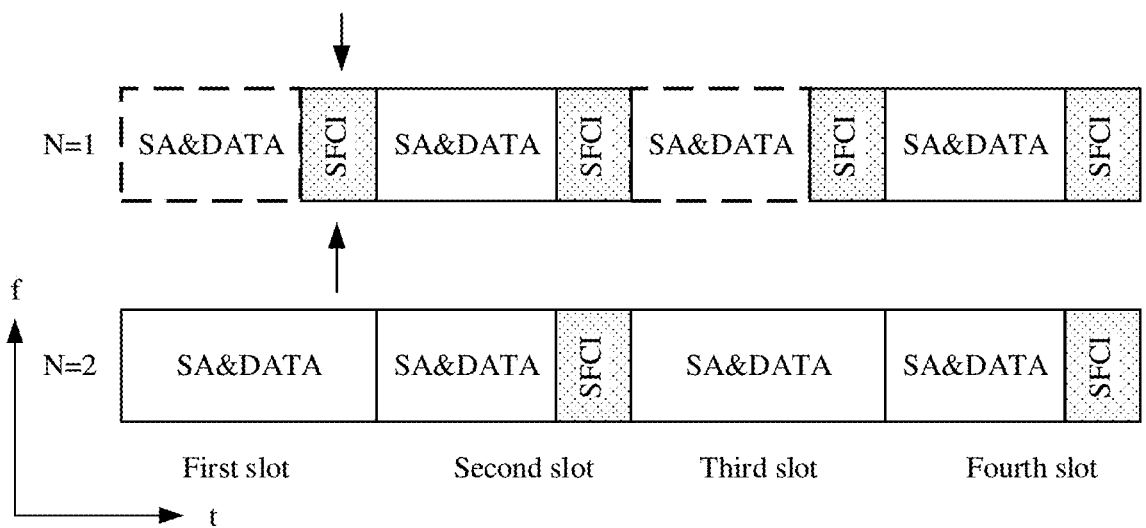

Alternatively, in this case, the first device determines to use a seventh preset rule, that is, the first device preferentially receives the control information, and sends the first data on the resource other than the at least one time domain symbol on the first resource. For example, refer to FIG. 14. FIG. 14 is similar to FIG. 13, and a difference lies in that the PSFCH resources in the first slot and the third slot in FIG. 14 are shown by using solid lines, and the resources other than the PSFCH resources in the first slot and the third slot are indicated by using dashed lines, indicating that the control information is preferentially received.

In some other embodiments, when determining that the first resource and the second resource overlap in the at least one time domain symbol, the first device may determine, based on a priority of the first data and a priority of the second data, whether to preferentially send the first data or preferentially receive the control information.

For example, if the priority of the first data is higher than the priority of the second data, the first device determines to use an eighth preset rule, that is, to send the first data on the first resource, and skip receiving the control information in the at least one time domain symbol. For another example, if the priority of the first data is lower than the priority of the second data, the first device determines to use a ninth preset rule, that is, to send the first data on the resource other than the at least one time domain symbol on the first resource, and receive the control information on the second resource.

In still some embodiments, if the priority of the first data is the same as the priority of the second data, the first device may determine, based on the first information, whether to use the sixth preset rule or the seventh preset rule. For ease of distinguishing, this preset rule is referred to as a tenth preset rule below. The first information herein is the same as the first information in Case 1. For a specific implementation, refer to the description in Case 1. Details are not described herein.

According to the sixth preset rule to the tenth preset rule, when it is determined that the first resource and the second resource overlap in the at least one symbol, how to transmit the first data and/or the control information, for example, preferentially ensure transmission of the control information, or determine, based on a priority of the data and a priority of data corresponding to the control information, to preferentially ensure transmission of the control information can be determined. This can avoid a possible conflict caused by sending and receiving of the data and the control information, and ensure reliability of transmission of the first data and/or the control information as much as possible.

Considering that the terminal device may share one radio frequency channel, that is, a half-duplex mechanism is used during communication, to be specific, the terminal device can only perform receiving or sending at a same moment, but cannot perform receiving and sending at the same time, in this embodiment, whether the first device sends the data or receives the control information is determined according to the sixth preset rule to the tenth preset rule, so that a half-duplex problem can be avoided.

It should be noted that the priority of the first data in Case 2 is the same as the priority of the first data in Case 1, and the priority of the second data is the same as the priority of the second data in Case 1. For a specific implementation, refer to the description in Case 1. Details are not described herein again.

Similar to Case 1, a receive end does not know whether the first data sent by a transmit end is all of the first data or the first data on which the rate matching has been performed. Therefore, in Case 2, the first device may also notify, by using the first indication information, the second device whether the first data sent by the first device is all of the first data or the first data on which the rate matching has been performed. For details, refer to the description of Case 1. Details are not described herein again. Similarly, the second device may send second indication information to the first device. For a specific implementation, refer to the description in Case 1. Details are not described herein again.

Case 3: The first device receives, on the first resource, the first data from the second device, and the first device sends the control information to the second device on the second resource.

Figure 15:
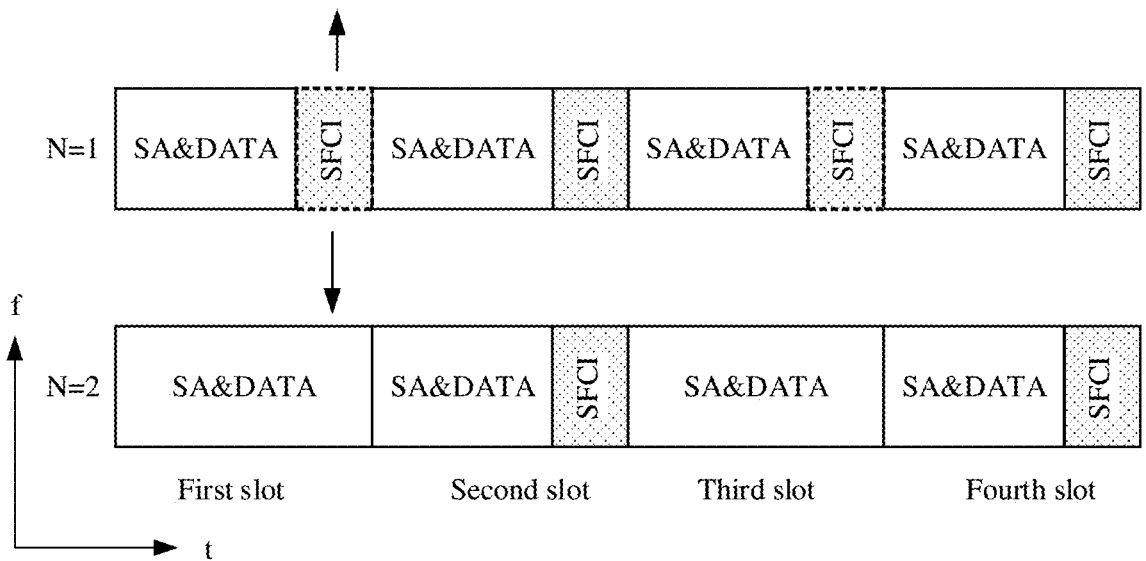

For example, FIG. 15 is a schematic diagram of the first resource and the second resource. FIG. 15 is similar to FIG. 11, and a difference lies in that in FIG. 15, an arrow direction indicates that the first data is received and the control information is sent.

In some embodiments, when the first resource and the second resource overlap in the at least one time domain symbol, the first device may preferentially receive the first data on the first resource, or the first device may preferentially send the control information on the first resource. Herein, that the first device preferentially receives the first data on the first resource may be considered as an eleventh preset rule. Correspondingly, that the first device preferentially sends the control information on the first resource may be considered as a twelfth preset rule. When the first device uses the eleventh preset rule or the twelfth preset rule may be agreed upon in advance by the first device and the second device. Alternatively, the second device may indicate a preset rule to be used by the first device.

In this case, the first device may determine that receiving the first data in the at least one symbol conflicts with sending the control information in the at least one symbol. In this case, the first device may preferentially receive the first data, and the first device discards the control information in the at least one time domain symbol, or in other words, the first device does not send the control information. That is, the first device receives only the first data, but does not send the control information on resources available for sending the control information, that is, on the PSFCH resources in the first slot and the third slot. For example, in FIG. 15, the PSFCH resources in the first slot and the third slot are shown by using dashed lines, indicating that the first data is preferentially received.

Figure 16:
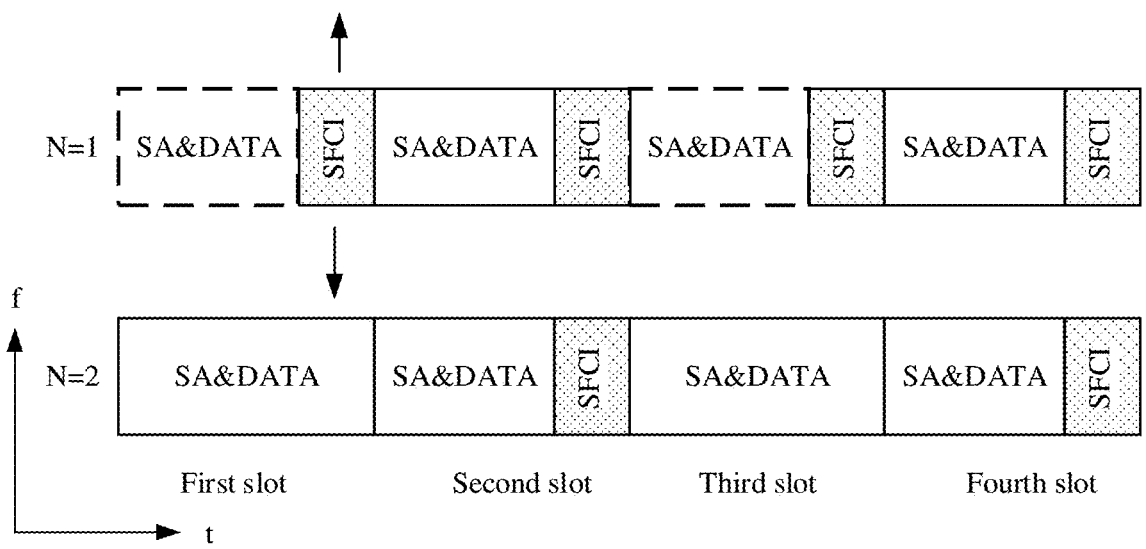

Alternatively, in this case, the first device may preferentially send the control information, and receive the first data on the resource other than the at least one time domain symbol on the first resource. For example, refer to FIG. 16. FIG. 16 is similar to FIG. 15, and a difference lies in that the PSFCH resources in the first slot and the third slot in FIG. 16 are shown by using solid lines, and the resources other than the PSFCH resources in the first slot and the third slot are indicated by using dashed lines, indicating that the control information is preferentially sent.

That the first device receives the first data on the resource other than the at least one time domain symbol on the first resource may also be considered as: when receiving the first data on the first resource, the first device punctures the first data, that is, when receiving the first data, the first device does not receive data or a signal in the at least one time domain symbol. Alternatively, it may be considered that when receiving the first data, the first device sets received data or information to 0 in a decoder in the at least one time domain symbol.

It should be noted that in FIG. 16, only an example in which N corresponding to the first resource is 2, and N corresponding to the second resource is 1 is used. Actually, a periodicity, M, corresponding to the first resource is greater than a periodicity, N, corresponding to the second resource. For example, both M=4 and N=1 are applicable. When sending the first data on the first resource, the first device may perform puncturing based on at least one time domain symbol corresponding to a minimum N value on the first resource or a resource that is in blind transmission resources without feedback and on which no feedback resource is configured, to ensure reliability of transmission of the first data and the control information.

In some other embodiments, when determining that the first resource and the second resource overlap in the at least one time domain symbol, the first device may determine, based on a priority of the first data and a priority of the second data, whether to preferentially receive the first data or send the control information.

For example, if the priority of the first data is higher than the priority of the second data, the first device determines to use a thirteenth preset rule, that is, to receive the first data on the first resource, and discard the control information in the at least one time domain symbol.

For another example, if the priority of the first data is lower than the priority of the second data, the first device determines to use a fourteenth preset rule, that is, to receive the first data on the resource other than the at least one time domain symbol on the first resource, and send the control information on the second resource.

In still some embodiments, if the priority of the first data is the same as the priority of the second data, the first device may determine, based on the first information, whether to use the eleventh preset rule or the twelfth preset rule. For ease of distinguishing, this preset rule is referred to as a fifteenth preset rule below. The first information herein is the same as the first information in Case 1. For specific implementation, refer to the description in Case 1. Details are not described herein.

According to the eleventh preset rule to the fifteenth preset rule, when it is determined that the first resource and the second resource overlap in the at least one symbol, how to transmit the first data and/or the control information, for example, preferentially ensure transmission of the control information, or determine, based on a priority of the data and a priority of data corresponding to the control information, to preferentially ensure transmission of the control information can be determined. This can avoid a possible conflict caused by sending and receiving of the data and the control information, and ensure reliability of transmission of the first data and/or the control information as much as possible.

Similar to Case 2, the priority of the first data in Case 3 is the same as the priority of the first data in Case 1, and the priority of the second data is the same as the priority of the second data in Case 1. For a specific implementation, refer to the description in Case 1. Details are not described herein again.

Case 4: The first device receives, on the first resource, the first data from the second device, and the first device receives, on the second resource, the control information from the second device.

Figure 17:
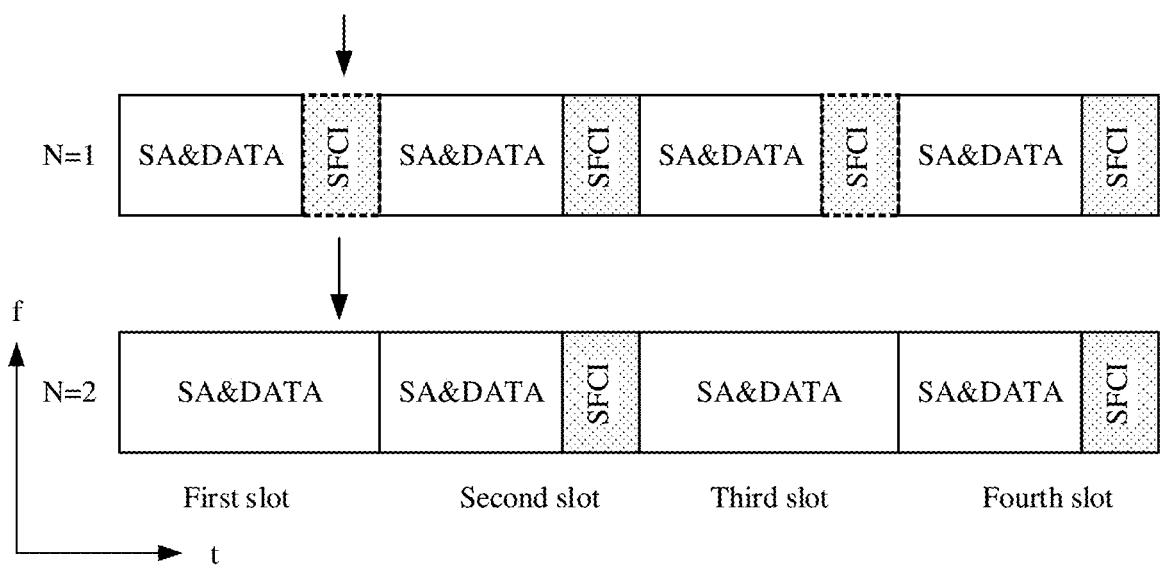

For example, FIG. 17 is a schematic diagram of the first resource and the second resource. FIG. 17 is similar to FIG. 11, and a difference lies in that in FIG. 17, an arrow direction indicates that the first data is received and the control information is received.

In some embodiments, when the first resource and the second resource overlap in the at least one time domain symbol, the first device may preferentially receive the first data on the first resource, or the first device may preferentially receive the control information on the first resource. Herein, that the first device preferentially receives the first data on the first resource may be considered as a sixteenth preset rule. Correspondingly, that the first device preferentially receives the control information on the first resource may be considered as a seventeenth preset rule. When the first device uses the sixteenth preset rule or the seventeenth preset rule may be agreed upon in advance by the first device and the second device. Alternatively, the second device may indicate a preset rule to be used by the first device.

In this case, the first device may determine that receiving the first data in the at least one symbol conflicts with receiving the control information in the at least one symbol. In this case, the first device may preferentially receive the first data, and the first device discards the control information in the at least one time domain symbol, or in other words, the first device does not receive the control information. That is, the first device receives only the first data, but does not receive the control information on resources available for receiving the control information, that is, on the PSFCH resources in the first slot and the third slot. For example, in FIG. 17, the PSFCH resources in the first slot and the third slot are shown by using dashed lines, indicating that the first data is preferentially received.

Figure 18:
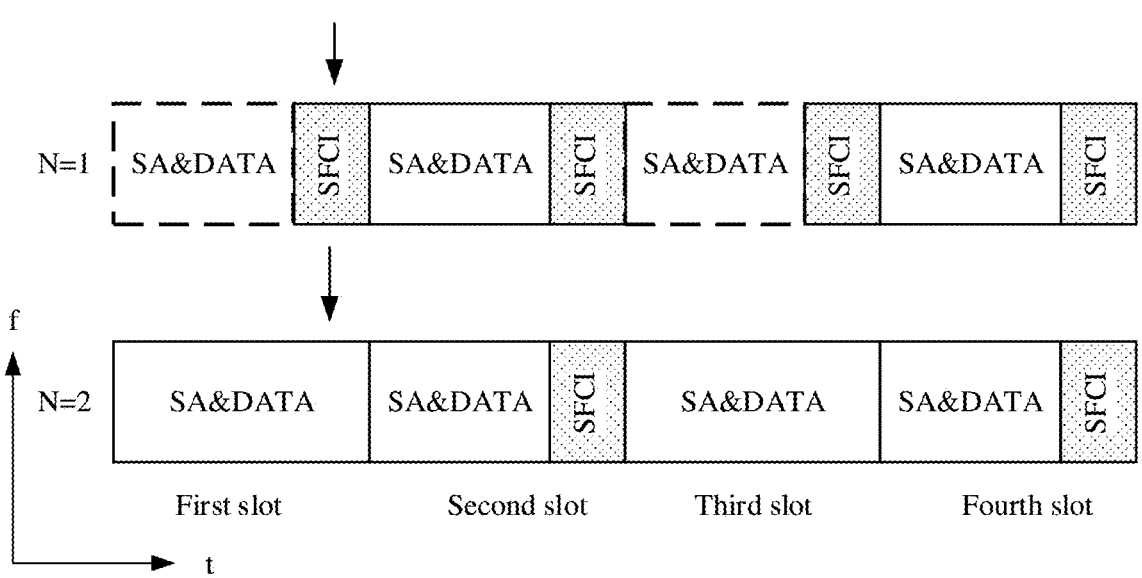

Alternatively, in this case, the first device may preferentially receive the control information, and receive the first data on the resource other than the at least one time domain symbol on the first resource. For example, refer to FIG. 18. FIG. 18 is similar to FIG. 17, and a difference lies in that the PSFCH resources in the first slot and the third slot in FIG. 18 are shown by using solid lines, and the resources other than the PSFCH resources in the first slot and the third slot are indicated by using dashed lines, indicating that the control information is preferentially received.

It should be noted that in FIG. 18, only an example in which N corresponding to the first resource is 2, and N corresponding to the second resource is 1 is used. Actually, a periodicity, M, corresponding to the first resource is greater than a periodicity, N, corresponding to the second resource. For example, both M=4 and N=1 are applicable. When sending the first data on the first resource, the first device may perform puncturing based on at least one time domain symbol corresponding to a minimum N value on the first resource or a resource that is in blind transmission resources without feedback and on which no feedback resource is configured, to ensure reliability of transmission of the first data and the control information.

In some other embodiments, when determining that the first resource and the second resource overlap in the at least one time domain symbol, the first device may determine, based on a priority of the first data and a priority of the second data, whether to preferentially receive the first data or receive the control information.

For example, if the priority of the first data is higher than the priority of the second data, the first device determines to use an eighteenth preset rule, that is, to receive the first data on the first resource, and skip receiving the control information in the at least one time domain symbol.

For another example, if the priority of the first data is lower than the priority of the second data, the first device determines to use a nineteenth preset rule, that is, to receive the first data on the resource other than the at least one time domain symbol on the first resource, and receive the control information on the second resource.

In still some embodiments, if the priority of the first data is the same as the priority of the second data, the first device may determine, based on the first information, whether to use the sixteenth preset rule or the seventeenth preset rule. For ease of distinguishing, this preset rule is referred to as a twentieth preset rule below. The first information herein is the same as the first information in Case 1. For specific implementation, refer to the description in Case 1. Details are not described herein.

According to the sixteenth preset rule to the twentieth preset rule, when it is determined that the first resource and the second resource overlap in the at least one symbol, how to transmit the first data and/or the control information, for example, preferentially ensure transmission of the control information, or determine, based on a priority of the data and a priority of data corresponding to the control information, to preferentially ensure transmission of the control information can be determined. This can avoid a possible conflict caused by sending and receiving of the data and the control information, and ensure reliability of transmission of the first data and/or the control information as much as possible.

Similar to Case 3, the priority of the first data in Case 4 is the same as the priority of the first data in Case 1, and the priority of the second data is the same as the priority of the second data in Case 1. For a specific implementation, refer to the description in Case 1. Details are not described herein again.

It should be noted that, in Case 4, before the previous symbol of the start symbol of the PSFCH resources, namely, the at least one time domain symbol, because no data is sent, AGC processing needs to be performed on the start symbol. If the AGC processing is performed on the start symbol, because the terminal device may share one radio frequency channel, a symbol that overlaps the at least one time domain symbol and that carries data is affected, and detection power of symbols that overlap the at least one time domain symbol, that are on all resources, and that carry data is affected. Therefore, when receiving the first data, in addition to performing puncturing in the at least one time domain symbol, the first device may further perform puncturing in one or more symbols used for AGC before the at least one time domain symbol.

Figure 19:
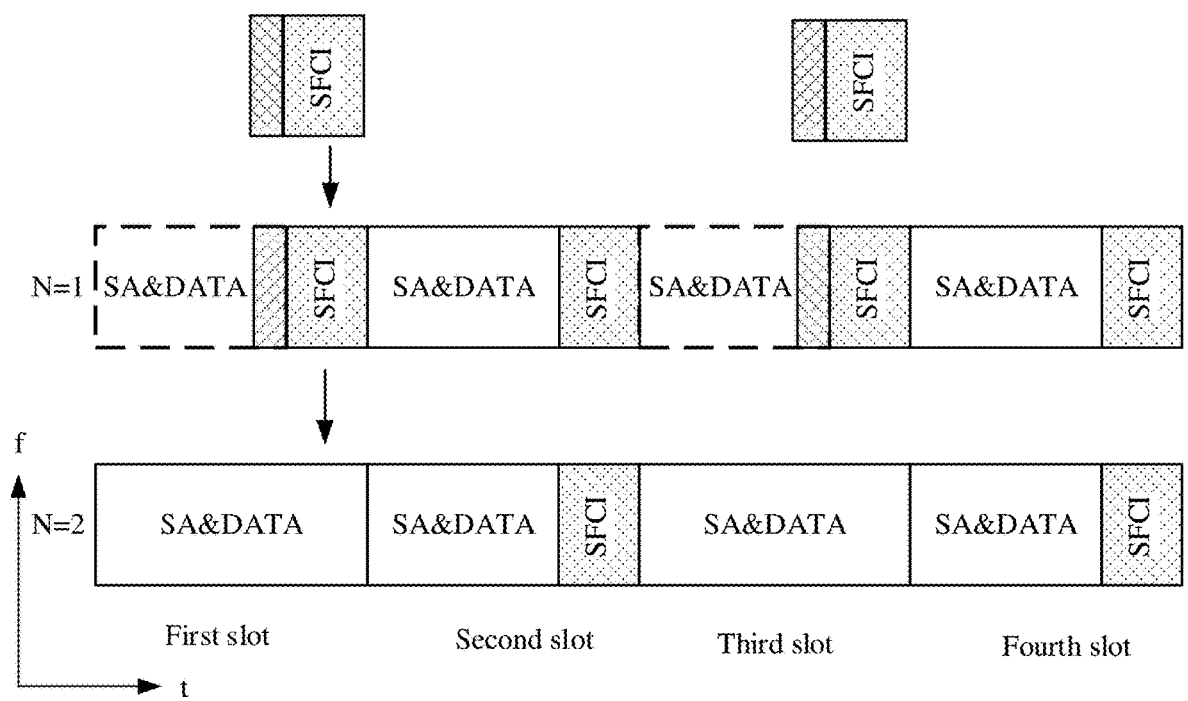

As shown in FIG. 19, when receiving the first data, in addition to performing puncturing in the at least one time domain symbol occupied by the PSFCH resources, the first device may further perform puncturing in one or more symbols (symbols shown by a shaded part in a dashed box in FIG. 19) before the at least one time domain symbol.

The foregoing embodiment is for how to transmit the first data and/or the control information when subcarrier spacings of the first resource and the second resource are the same. The following describes a technical solution for transmitting the first data and/or the control information in the embodiments of this application, when subcarrier spacings of the first resource and the second resource are different.

Figure 20:
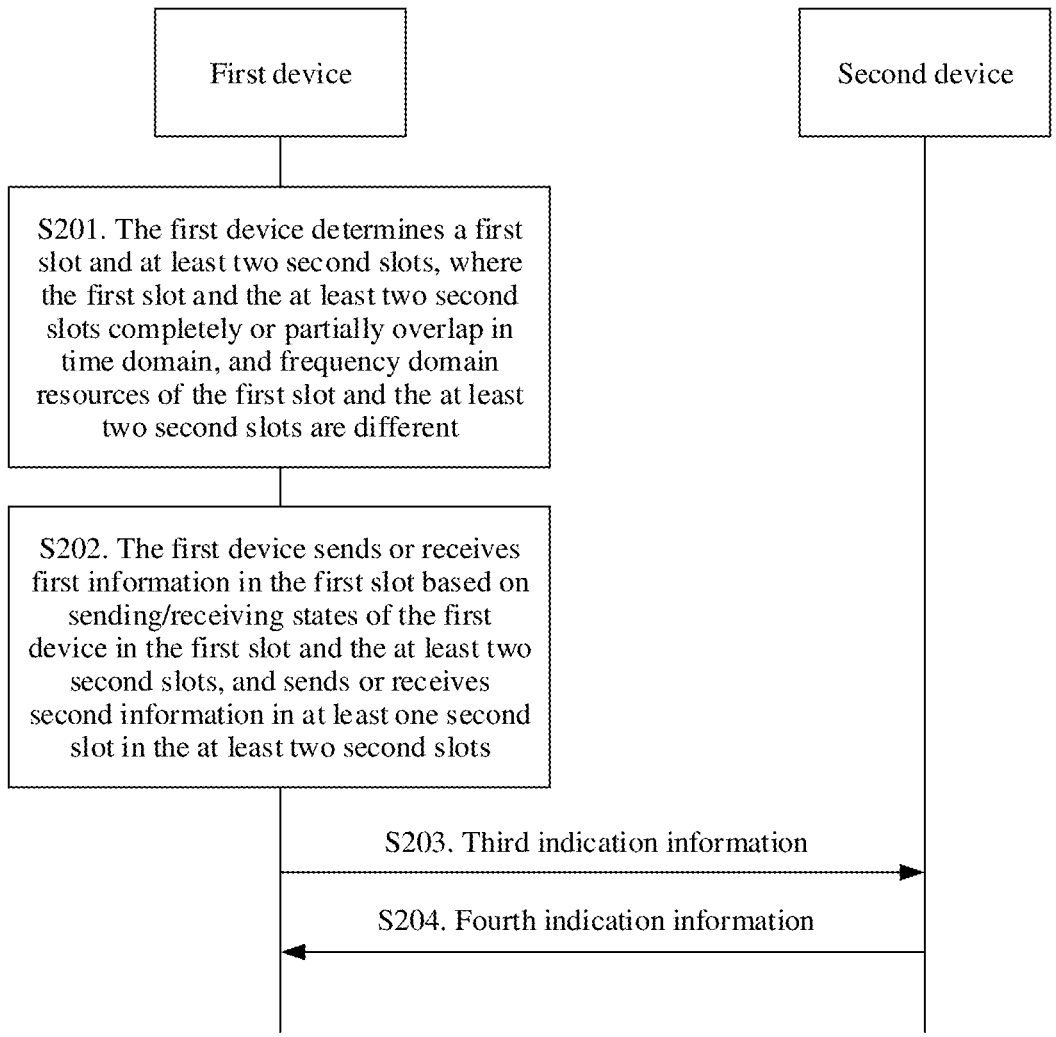
FIG. 20 is a schematic flowchart of a communication method according to an embodiment of this application.

FIG. 20 is a flowchart of a communication method according to an embodiment of this application. The following provides a description by using an example in which the method is used in the network architecture shown in FIG. 2 or FIG. 4.

S201. A first device determines a first slot and at least two second slots, where the first slot and the at least two second slots completely or partially overlap in time domain, and frequency domain resources of the first slot and the at least two second slots are different.

Herein, the first slot may be used to transmit first information, and the at least two second slots may be used to transmit second information. The first information may be data, or may be control information. The second information may be data, or may be control information. In this application, considering that subcarrier spacings of a first resource and a second resource may be different, when the subcarrier spacings of the first resource and the second resource are different, a conflict may exist when the data or the control information is sent on an overlapping resource of the first resource and the second resource. There is no solution to this problem currently.

Therefore, for the case in which the subcarrier spacings of the first resource and the second resource are different, this embodiment provides a technical solution of how to transmit the data and the control information. The following first describes several different implementations of the first slot and the at least two second slots.

The first slot and the at least two second slots completely overlap or partially overlap in time domain, and the frequency domain resources of the first slot and the at least two second slots are different.

For example, the first slot and the at least two second slots are located in a same frequency band; the first slot and the at least two second slots are located on a same carrier; or the first slot and the at least two second slots are located in a same bandwidth part.

In a possible implementation, the at least two second slots are two second slots consecutive in time domain.

For example, a first subcarrier spacing of the first slot is less than a second subcarrier spacing of the at least two second slots. For example, the first subcarrier spacing may be 15 kHz, and the second subcarrier spacing may be 30 kHz. For another example, the first subcarrier spacing may be 15 kHz, and the second subcarrier spacing may be 60 kHz. For another example, the first subcarrier spacing may be 30 kHz, and the second subcarrier spacing may be 60 KHz.

Figure 21:
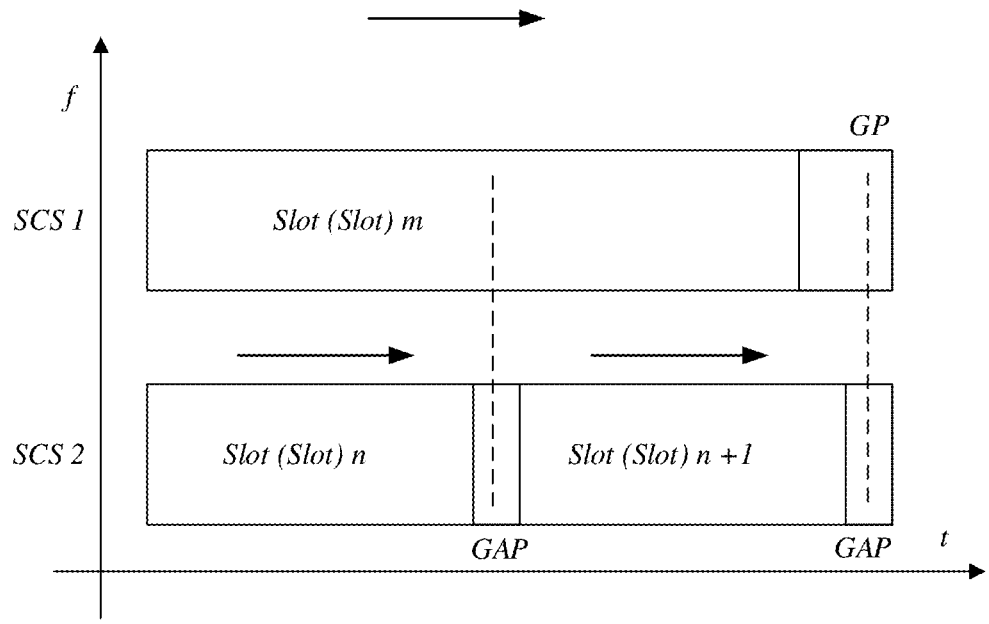
FIG. 21 to FIG. 27 are schematic diagrams of transmitting first information and second information according to an embodiment of this application.

FIG. 21 is a schematic diagram of the first slot and the at least two second slots. In FIG. 21, for example, a subcarrier spacing SCS 2 of the second slot is twice a subcarrier spacing SCS 1 of the first slot. A structure in the figure includes one first slot (slot m) and two second slots (slot n and slot n+1). In FIG. 21, arrow directions indicate transmission directions of the first information and the second information. In FIG. 21 and the following description, arrows pointing to the right indicate sending, and arrows pointing to the left indicate receiving.

In this embodiment, solutions for transmitting the first information and/or the second information by the first device may be separately provided for several cases of the first slot and the at least two second slots, so that reliability of transmission of the first information and/or the second information may be improved for a plurality of application scenarios.

S202. The first device sends or receives the first information in the first slot based on sending/receiving states of the first device in the first slot and the at least two second slots, and sends or receives the second information in at least one second slot in the at least two second slots.

Because the at least two second slots are used to transmit the second information, the second information may be sent in both the at least two second slots, the second information may be received and sent in both the at least two second slots, or the second information may be sent in a part of second slots in the at least two second slots, and other information is received in another part of second slots. Alternatively, the second information may be received in a part of second slots in the at least two second slots, and other information is sent in another part of second slots. In other words, there are a plurality of cases of sending/receiving states of the second information in the at least two second slots. With reference to the sending/receiving state of the first information in the first slot, for different sending/receiving states in the first slot and the at least two second slots, solutions for the first device to transmit the first information and/or the second information are also different, and may include the following several cases.

Case 1: The sending/receiving states of the first device in the first slot and the at least two second slots are a sending state, and the first device sends the first information in the first slot, and sends the second information in the at least two second slots.

Still refer to FIG. 21. The last symbol in each second slot in the two second slots may be used as a blank symbol for switching between receiving and sending. For example, the last symbol in the first slot in FIG. 21 is a GAP symbol, and the last symbol in each second slot in the two second slots is a GAP symbol. In this case, the first device may determine to use Manner 1, Manner 2, or Manner 3 below to send the first information and/or the second information.

Manner 1: The first device does not send the first information in the last symbol in the first slot, and the first device does not send the second information in the last symbol in each second slot in the at least two second slots. Therefore, the last symbol in a previous slot of the at least two second slots may be used for other purposes, for example, used as a blank symbol for switching between receiving and sending.

Manner 2: The first device does not send the first information in the last symbol in the first slot, and the first device does not send the second information in the last symbol in the last second slot in the at least two second slots. In addition, transmit power of the first device in each second slot in the at least two second slots is the same.

Manner 3: The first device does not send the first information in the last symbol in the first slot, and the first device does not send the second information in the last symbol in the last second slot in the at least two second slots. In addition, transmit power of the first device on each subcarrier in each second slot is the same.

Based on Case 1 in which a resource for transmitting the first information conflicts with a resource for transmitting the second information, this embodiment provides three transmission manners of the first information and/or the second information, to ensure reliability of transmission of the first information and the second information. Further, it is ensured that transmission in each slot or carrier may be independently performed, and transmit power of the first device in each second slot is the same or transmit power on each subcarrier in each second slot is the same. Therefore, reliability of transmission in each slot or carrier can be ensured.

Case 2: The sending/receiving states of the first device in the first slot and the at least two second slots are a receiving state, and the first device receives the first information in the first slot, and receives the second information in the at least two second slots.

Figure 22:
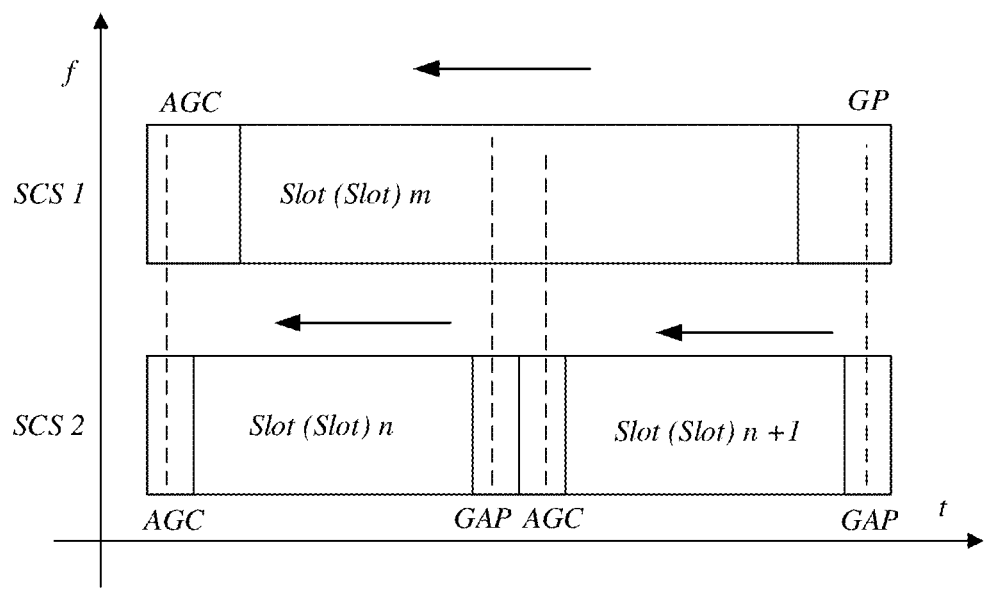

FIG. 22 is a schematic diagram of the first slot and the at least two second slots, including one first slot (slot m) and two second slots (slot n and slot n+1). Slot m is used to receive the first information, and slot n and slot n+1 are used to receive the second information. The first symbol in slot m may be used as a symbol for AGC processing, and/or the first symbol in each slot in slot n and slot n+1 may also be used as a symbol for AGC processing. In addition, the last symbol in each slot in slot n and slot n+1 may be used as a blank symbol for switching between sending and receiving. If the first symbol of slot m is used for AGC processing, one or more symbols before slot n in slot n and slot n+1 are damaged.

Therefore, the first device may determine to use Manner 1, that is, the first device does not receive the first information in the first symbol in the first slot, and the first device punctures the second information in the first K symbols in the first second slot in the at least two second slots. K is a positive integer not less than a ratio of the second inter-subcarrier spacing to the first subcarrier spacing.

For example, the first device does not receive the first information in the first symbol in slot m, and punctures the second information in at least one symbol in slot n.

Alternatively, the first device determines to use Manner 2, that is, the first device punctures the first information in an overlapping symbol of the first slot and the first symbol in each second slot in the at least two second slots, and punctures the second information in the first symbol in each second slot.

For example, the first device punctures the first information in an overlapping symbol of slot m and the first symbol of slot n, and in an overlapping symbol of slot m and the first symbol of slot n+1; and punctures the second information in the first symbol of slot n and slot n+1.

Based on Case 2, this embodiment provides two transmission manners of the first information and/or the second information, so as to ensure the reliability of the transmission of the first information and/or the second information when the first symbol in the first slot may be used for other purposes, and symbols that are in the at least two second slots and that overlap the first symbol may be damaged.

Case 3: The sending/receiving state of the first device in the first slot is a sending state, the sending/receiving state of the first device in the at least two second slots is a receiving state, and the first device sends the first information in the first slot, and receives the second information in the at least two second slots.

Figure 23:
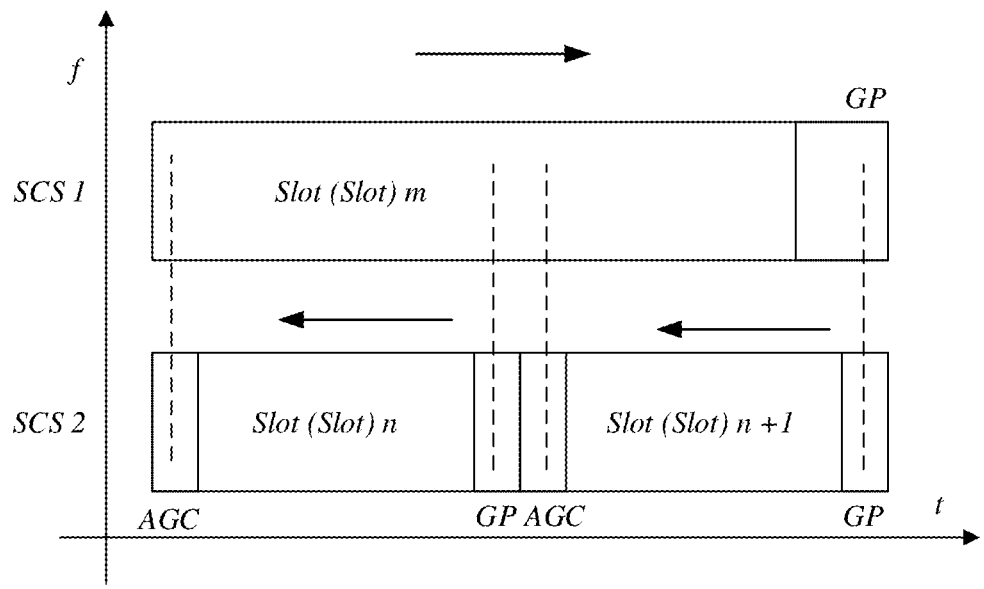

FIG. 23 is a schematic diagram of the first slot and the at least two second slots, including one first slot (slot m) and two second slots (slot n and slot n+1). Slot m is used to send the first information, and slot n and slot n+1 are used to receive the second information. Because the first device may use one radio frequency channel, the first device cannot perform receiving concurrent with sending. Therefore, whether to preferentially send the first information or preferentially receive the second information needs to be determined, to ensure reliability of transmission of the first information and/or the second information.

In an example in which the first device determines to transmit the first information and/or the second information, the first device determines that a first priority is higher than a second priority, and may send the first information and skip receiving the second information in slot m. That is, when the first priority is higher than the second priority, the first device preferentially ensures transmission of the first information.

Herein, the first priority corresponds to a priority of the first information, and the second priority corresponds to a priority of the second information. For example, the first priority may be a priority of a resource pool in which the first information is located, and correspondingly the second priority is a priority of a resource pool in which the second information is located. Alternatively, the first priority may be a priority of a bandwidth part in which the first information is located, and correspondingly the second priority is a priority of a bandwidth part in which the second information is located. Alternatively, the first priority may be a priority of a first subcarrier spacing in which the first information is located, and correspondingly the second priority is a priority of a second subcarrier spacing in which the second information is located. Alternatively, the first priority may be a priority of a carrier on which the first information is located, and correspondingly the second priority is a priority of a carrier on which the second information is located. Alternatively, the first priority is a priority of data corresponding to the first information, and the second priority is a priority of data corresponding to the second information. Alternatively, the first priority is greater than a first threshold and/or the second priority is lower than a second threshold.

In another example in which the first device determines to transmit the first information and/or the second information, the first device determines that the first priority is lower than the second priority, and may discard the first information and receive the second information in slot m. That is, when the first priority is lower than the second priority, the first device preferentially ensures transmission of the second information.

In Case 3, because sending the first information and receiving the second information may cause a resource conflict, for Case 3, this embodiment provides two transmission manners of the first information and/or the second information. Therefore, how to transmit the first information and/or the second information may be determined mainly based on the first priority and the second priority, and a half-duplex problem of the first device in a communication process can be resolved, thereby ensuring the reliability of the transmission of the first information and/or the second information.

Case 4: The sending/receiving state of the first device in the first slot is a sending state, the sending/receiving state of the first device in the at least two second slots includes the sending state or a receiving state, and the first device sends the second information in a first part of second slots in the at least two second slots, and receives the second information in a second part second slots in the at least two second slots. In addition, the first device sends the first information in the first slot, and sends or receives the second information in the at least two second slots.

Figure 24:
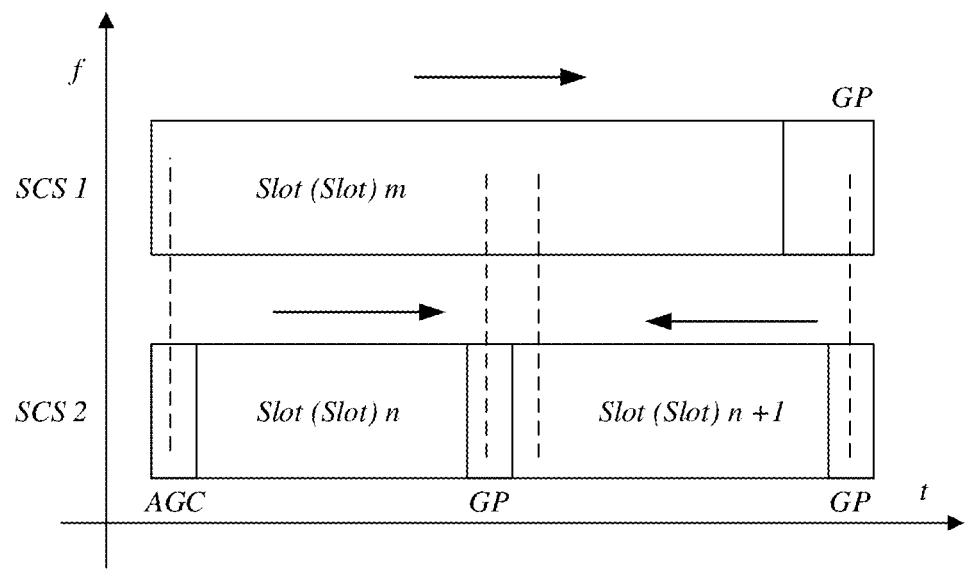

FIG. 24 is a schematic diagram of the first slot and the at least two second slots, including one first slot (slot m) and two second slots (slot n and slot n+1). Slot m is used to send the first information, slot n is used to send the second information, and slot n+1 is used to receive the second information.

Figure 25:
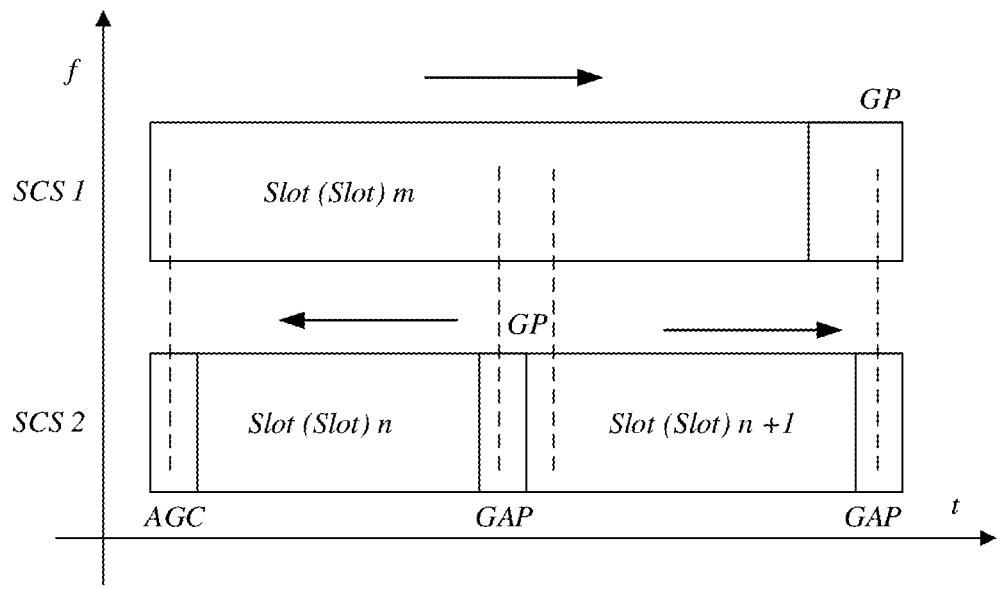

Alternatively, FIG. 25 is a schematic diagram of the first slot and the at least two second slots, including one first slot (slot m) and two second slots (slot n and slot n+1). Slot m is used to send the first information, slot n is used to receive the second information, and slot n+1 is used to send the second information. Because the first device may use one radio frequency channel, the first device cannot perform receiving concurrent with sending. Therefore, if a sending-receiving conflict exists on overlapping resources of the first slot and the at least two second slots, the first device needs to determine whether to preferentially send the first information or preferentially receive the second information, so as to ensure reliability of transmission of the first information and/or the second information.

In an example in which the first device determines to transmit the first information and/or the second information, the first device determines that a first priority is higher than a second priority, and the first device may send the first information in the first slot, and send the second information in the first part of second slots. For example, in FIG. 24, the first device determines to send the first information in slot m, and send the second information in slot n+1. For another example, in FIG. 25, the first device determines to send the first information in slot m, and send the second information in slot n. It can be learned that in FIG. 24 and FIG. 25, the first device preferentially ensures sending of the first information based on the priority, so as to ensure the reliability of the transmission of the first information and the second information.

In another example in which the first device determines to transmit the first information and/or the second information, if the first device determines that the first priority is lower than the second priority, the first device may send the first information in a symbol that in the first slot and that does not overlap the first part of second slots, and the first device sends the second information in the first part of second slots and/or receives the second information in the second part of second slots. For example, in FIG. 24, the first device determines to send the first information in an overlapping symbol of slot m and slot n+1, and send the second information in slot n+1. Alternatively, the first device determines to send the first information in an overlapping symbol of slot m and slot n+1, and receive the second information in slot n. Alternatively, the first device determines to send the first information in an overlapping symbol of slot m and slot n+1, send the second information in slot n+1, and receive the second information in slot n.

For another example, in FIG. 25, the first device determines to send the first information in an overlapping symbol of slot m and slot n, and send the second information in slot n. Alternatively, the first device determines to send the first information in an overlapping symbol of slot m and slot n, and receive the second information in slot n+1. Alternatively, the first device determines to send the first information in an overlapping symbol of slot m and slot n, receive the second information in slot n+1, and send the second information in slot n.

It should be noted that specific implementations of the first priority and the second priority herein are the same as the specific implementations of the first priority and the second priority in Case 3. Details are not described herein again.

For Case 4, this embodiment provides two transmission manners of the first information and/or the second information, to resolve a problem of how to transmit the first information and/or the second information when sending the first information and receiving the second information may cause a resource conflict. Whether sending or receiving is preferentially performed is mainly determined based on a priority. This can resolve a half-duplex problem of the first device in a communication process, and ensure the reliability of the transmission of the first information and/or the second information.

In some embodiments, that the first device sends the first information on a resource that is in the first slot and that does not overlap some second subslots may be that the first device sends the first information on a resource, on overlapping resources of the first slot and the first part of second slots, other than a symbol corresponding to a sending-receiving switching interval between the first part of second slots and the second part of second slots. For example, in FIG. 24, the first device determines to send the first information on resources, on overlapped symbols of slot m and slot n+1, other than a symbol corresponding to a sending-receiving switching interval between slot n and slot n+1, for example, resources other than a GP symbol in FIG. 24. This can avoid damage to the first information caused because resources other than the overlapping resources include a symbol used as a sending-receiving switching interval.

S203. The first device sends third indication information to the second device, so that the second device receives the third indication information.

The third indication information herein may be used by the first device to send the first information on all symbols in the first slot. Alternatively, the third indication information is used to indicate the first device to send the first information in some symbols in the first slot.

The first device sometimes sends the first information in all symbols in the first slot, and sometimes sends the first information in some symbols in the first slot, but the second device does not know this. To ensure that the second device correctly receives the first information sent by the first device, in some embodiments, when sending the first information, the first device may further notify the second device whether the sent first information occupies all symbols or some symbols in the first slot.

For example, if the first device sends the first information to the second device, the first device may notify, by using the third indication information, the second device whether the first device occupies all symbols or some symbols in the first slot when sending the first information.

For example, the first device may send the third indication information to the second device, so that the second device receives the third indication information. The third indication information indicates the first device to send the first information in all symbols in the first slot. Alternatively, the third indication information is used to indicate the first device to send the first information in some symbols in the first slot.

For a specific implementation of the third indication information, refer to the specific implementation of the first indication information. Details are not described herein again.

S204. The second device sends fourth indication information to the first device, so that the second device receives the fourth indication information.

Similar to the third indication information, the fourth indication information may indicate the second device to send the first information in all symbols in the first slot. Alternatively, the fourth indication information is used to indicate the second device to send the first information in some symbols in the first slot. For example, if the second device sends the first information to the first device, the second device may notify, by using the fourth indication information, the first device whether the second device occupies all symbols or some symbols in the first slot when sending the first information.

A specific implementation of the fourth indication information is similar to the specific implementation of the third indication information. For details, refer to the implementation of the third indication information. Details are not described herein again.

It should be noted that there is no sequence in performing S203 and S204. The execution sequence of S203 and S204 is not limited in this embodiment.

It should be noted that, a difference between the third indication information and the first indication information further lies in that the third indication information further indicates that some symbols that are not occupied when the first device sends the first information may also be considered as discarded symbols. For example, the third indication information may indicate that symbols that are in the first slot and that overlap the at least two second slots are discarded. For another example, the third indication information may indicate a discarded symbol based on a ratio of the first subcarrier spacing of the first slot to the second subcarrier spacing of the at least two second slots.

If there are a plurality of subcarriers, the third indication information may indicate a discarded symbol based on a ratio of a minimum subcarrier spacing to a maximum subcarrier spacing. For example, if the first subcarrier spacing is twice the second subcarrier spacing, the third indication information may occupy one bit to indicate the discarded symbol. For example, when a value indicated by the third indication information is "0", it may indicate that the discarded symbol is an overlapping symbol of the first slot and the first part of second slots. Correspondingly, when a value of a first field is "1", it may indicate that the discarded symbol is an overlapping symbol of the first slot and the second part of second slots. In another embodiment, when a value indicated by the third indication information is "1", it may indicate that the discarded symbol is an overlapping symbol of the first slot and the first part of second slots. Correspondingly, when a value of a first field is "0", it may indicate that the discarded symbol is an overlapping symbol of the first slot and the second part of second slots.

For example, if the first subcarrier spacing is four times the second subcarrier spacing, the third indication information may occupy two bits to indicate the discarded symbol. A manner in which the third indication occupies two bits to indicate the discarded symbol is similar to the manner in which the third indication occupies two bits to indicate the discarded symbol. Details are not described herein again.

Case 5: The sending/receiving state of the first device in the first slot is a receiving state, and the sending/receiving state of the first device in the at least two second slots include a sending state or the receiving state. The first device sends the second information in a first part of second slots in the at least two second slots, and receives the second information in a second part of second slots in the at least two second slots. The first device receives the first information in the first slot, and sends or receives the second information in the at least two second slots.

Figure 26:
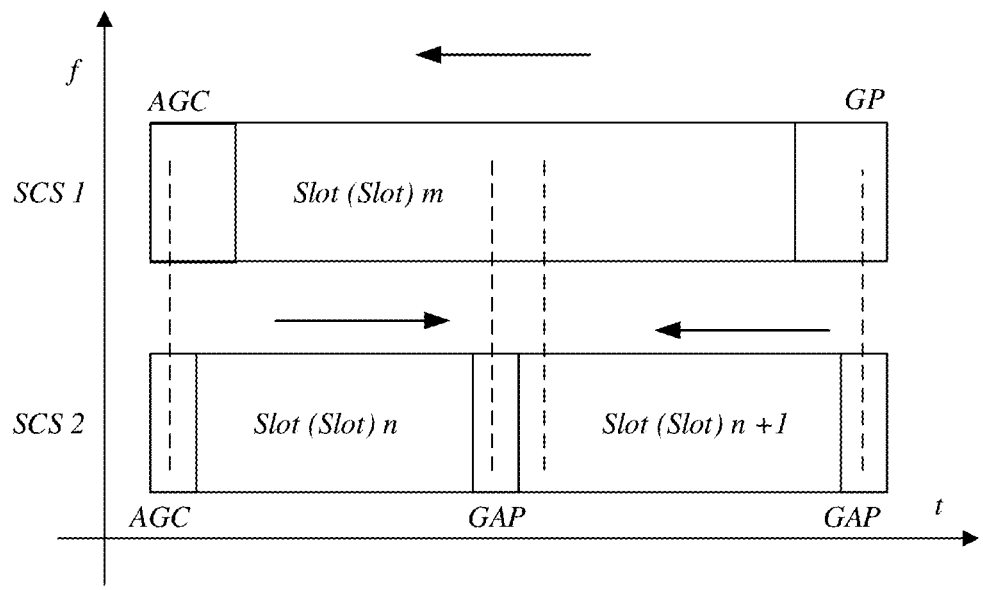

FIG. 26 is a schematic diagram of the first slot and the at least two second slots, including one first slot (slot m) and two second slots (slot n and slot n+1). Slot m is used to receive the first information, slot n is used to send the second information, and slot n+1 is used to receive the second information.

Figure 27:
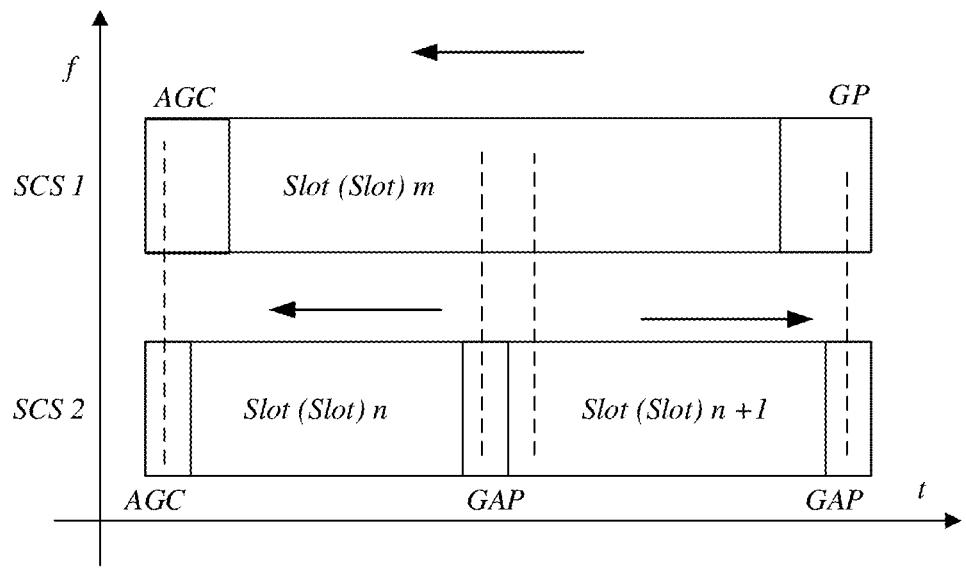

Alternatively, FIG. 27 is a schematic diagram of the first slot and the at least two second slots, including one first slot (slot m) and two second slots (slot n and slot n+1). Slot m is used to receive the first information, slot n is used to receive the second information, and slot n+1 is used to send the second information. Because the first device may use one radio frequency channel, the first device cannot perform receiving concurrent with sending. Therefore, if a sending-receiving conflict exists on overlapping resources of the first slot and the at least two second slots, the first device needs to determine whether to preferentially receive the first information or preferentially send the second information, so as to ensure reliability of transmission of the first information and/or the second information. In addition, the first device receives the first information in the first slot, and receives the second information in the at least two second slots. Because each second slot in the at least two second slots may be reserved for other purposes, for example, used as a symbol for AGC processing, the first information on a symbol that is in the first slot and that overlaps the symbol may be damaged. Therefore, in this embodiment, a solution of receiving the first information in the first slot and receiving the second information in the at least two second slots is determined, thereby ensuring reliability of transmission of the first information and/or the second information.

In an example in which the first device determines to transmit the first information and/or the second information, the first device determines that a first priority is higher than a second priority, and the first device may receive the first information in the first slot, and receive the second information in the first part of second slots. For example, in FIG. 26, the first device determines to receive the first information in slot m, and receive the second information in slot n. For another example, in FIG. 27, the first device determines to receive the first information in slot m, and receive the second information in slot n+1. It can be learned that in FIG. 26 and FIG. 27, the first device preferentially ensures receiving of the first information based on a priority, so as to ensure reliability of transmission of the first information and the second information.

It should be noted that specific implementations of the first priority and the second priority herein are the same as the specific implementations of the first priority and the second priority in Case 3. Details are not described herein again.

In another example in which the first device determines to transmit the first information and/or the second information, if the first device determines that the first priority is lower than the second priority, the first device may receive the first information in a symbol that is in the first slot and that does not overlap the first part of second slots, and the first device sends the second information in the first part of second slots and/or receives the second information in the second part of second slots.

For example, in FIG. 26, the first device determines to receive the first information in an overlapping symbol of slot m and slot n, and send the second information in slot n+1. Alternatively, the first device determines to receive the first information in an overlapping symbol of slot m and slot n, and receive the second information in slot n. Alternatively, the first device determines to receive the first information in an overlapping symbol of slot m and slot n, receive the second information in slot n, and send the second information in slot n+1.

For another example, in FIG. 27, the first device determines to receive the first information in an overlapping symbol of slot m and slot n+1, and send the second information in slot n. Alternatively, the first device determines to receive the first information in an overlapping symbol of slot m and slot n+1, and receive the second information in slot n+1. Alternatively, the first device determines to receive the first information in an overlapping symbol of slot m and slot n+1, receive the second information in slot n+1, and send the second information in slot n.

For Case 4, this embodiment of provides two transmission manners of the first information and/or the second information, to resolve a problem of how to transmit the first information and/or the second information when sending the first information and receiving the second information may cause a resource conflict. Whether sending or receiving is preferentially performed is mainly determined based on a priority. This can resolve a half-duplex problem of the first device in a communication process, and ensure the reliability of the transmission of the first information and/or the second information.

Similar to Case 4, the first device sometimes receives the first information in all symbols in the first slot, and sometimes receives the first information in some symbols in the first slot, but the second device does not know this. Therefore, the first device may notify the second device of symbols occupied by the first device to receive the first information, so that the second device sends the first information to the first device in the corresponding symbols.

For example, if the first device receives the first information from the second device, the first device may notify, by using fifth indication information, the second device whether the first device occupies all symbols or some symbols in the first slot when receiving the first information. For example, the first device may send the fifth indication information to the second device, so that the second device receives the fifth indication information. The fifth indication information indicates the first device to receive the first information in all symbols in the first slot. Alternatively, the fifth indication information is used to indicate the first device to receive the first information in some symbols in the first slot.

For a specific implementation of the fifth indication information, refer to the specific implementation of the third indication information. Details are not described herein again.

For example, if the second device receives the first information from the first device, the second device may notify, by using sixth indication information, the first device whether the second device occupies all symbols or some symbols in the first slot when receiving the first information. For example, the second device may send the sixth indication information to the first device, so that the first device receives the sixth indication information from the second device. The sixth indication information indicates the second device to receive the first information in all symbols in the first slot. Alternatively, the sixth indication information is used to indicate the second device to receive the first information in some symbols in the first slot.

A specific implementation of the sixth indication information is similar to the specific implementation of the third indication information. For details, refer to the implementation of the third indication information. Details are not described herein again.

In FIG. 21 to FIG. 27 above, an example in which the subcarrier spacing SCS 2 of the second slot is twice the subcarrier spacing SCS 1 of the first slot is used. A structure in the figure includes one first slot (slot m) and two second slots (slot n and slot n+1). In actual application, a relative relationship between the SCS 1 and the SCS 2 in frequency domain is not limited in this embodiment. For example, this embodiment is also applicable to cases in which the subcarrier spacing SCS 2 of the second slot is four times the subcarrier spacing SCS 1 of the first slot.

Figure 28:
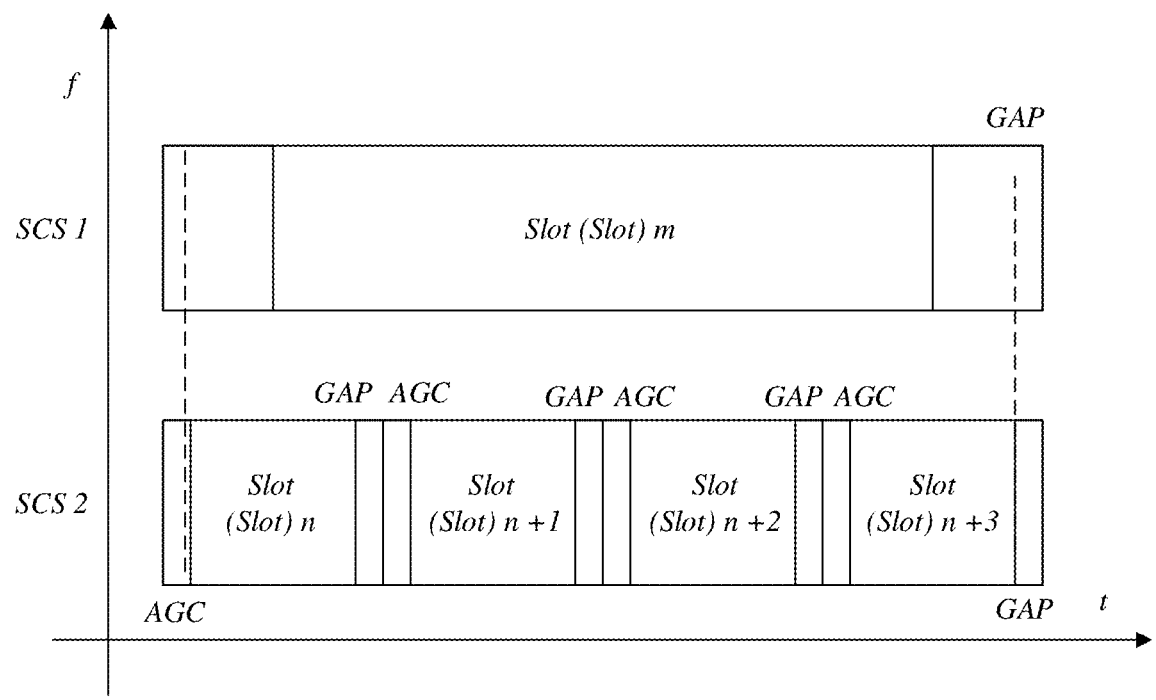
FIG. 28 is a schematic diagram of transmitting first information and second information in another scenario according to an embodiment of this application.

In some embodiments, FIG. 28 is a schematic diagram of the first slot and the at least two second slots, including one first slot (slot m) and four second slots. The four second slots are slot n, slot n+1, slot n+2, and slot n+3.

For example, if slot m is used to send the first information, slot n, slot n+1, slot n+2, and slot n+3 are used to send the second information. In this case, a technical solution in which the first device sends the first information and/or the second information is similar to Case 1 above (corresponding to FIG. 21), and a difference lies in that quantities of symbols not used for sending the first information and/or the second information are different. For details, refer to Case 1 above. Details are not described herein again.

For example, if slot m is used to receive the first information, slot n, slot n+1, slot n+2, and slot n+3 are used to receive the second information. In this case, a technical solution in which the first device receives the first information and/or the second information is similar to Case 2 above (corresponding to FIG. 22), and a difference lies in that quantities of symbols not used for receiving the first information and/or the second information are different. For details, refer to Case 2 above. Details are not described herein again.

For example, if slot m is used to send the first information, slot n, slot n+1, slot n+2, and slot n+3 are used to receive the second information. In this case, a technical solution in which the first device receives the first information and/or the second information is similar to Case 3 above (corresponding to FIG. 23). Because the first device may use one radio frequency channel, the first device cannot perform receiving concurrent with sending. Therefore, whether to preferentially send the first information or preferentially receive the second information needs to be determined, to ensure reliability of transmission of the first information and/or the second information.

Further, the first device may determine, by using a technical solution similar to that in Case 3, to discard the first information and receive the second information in slot m. Alternatively, the first device may determine to send the first information and not to receive the second information in slot m.

For example, if slot m is used to send the first information, some slots in slot n, slot n+1, slot n+2, and slot n+3 are used to send the second information, and slots other than these slots are used to receive the second information. For example, slot n and slot n+1 are used to send the second information, and slot n+2 and slot n+3 are used to receive the second information. For another example, slot n and slot n+2 are used to send the second information, and slot n+1 and slot n+3 are used to receive the second information. Examples are not enumerated herein one by one.

In this case, for a sending-receiving conflicting part, for example, for an overlapping part of slot m and slot n+2 and slot n+3, the first device may determine, by using a technical solution similar to that in Case 4, whether to preferentially send the first information or preferentially receive the second information. Therefore, reliability of transmission of the first information and the second information is ensured. In a non-overlapping part, the first device may determine, by using a technical solution similar to that in Case 1 or Case 2, symbols in which the first information is not sent. Details are not described herein again.

For example, if slot m is used to receive the first information, some slots in slot n, slot n+1, slot n+2, and slot n+3 are used to send the second information, and slots other than these slots are used to receive the second information. For example, slot n and slot n+1 are used to send the second information, and slot n+2 and slot n+3 are used to receive the second information. For another example, slot n and slot n+2 are used to send the second information, and slot n+1 and slot n+3 are used to receive the second information. Examples are not enumerated herein one by one.

In this case, for a sending-receiving conflicting part, for example, for an overlapping part of slot m and slot n and slot n+1, the first device may determine, by using a technical solution similar to that in Case 5, whether to preferentially receive the first information or preferentially send the second information. Therefore, reliability of transmission of the first information and the second information is ensured. In a non-overlapping part, the first device may determine, by using a technical solution similar that in Case 1 or Case 2, symbols in which the first information is not received. Details are not described herein again.

When the first device determines that the first resource used to send or receive the first data overlaps the second resource used to send or receive the control information, the first device may determine how to send or receive the first data on the first resource. For example, the first device sends or receives the first data on the resource other than the overlapping resource on the first resource, or the first device may determine to send or receive the first data and discard or skip receiving the control information on the first resource. In other words, a solution of how the first device transmits the first data and/or the control information is provided, so that reliability of transmission of the data and/or the control information can be ensured.

In the foregoing embodiments provided in this application, the methods provided in the embodiments of this application are separately described from a perspective of interaction between the first device and the second device. To implement functions in the foregoing methods provided in the embodiments of this application, the first device and the second device may include a hardware structure and/or a software module, and implement the foregoing functions in a form of the hardware structure, the software module, or a combination of the hardware structure and the software module. Whether a function of the foregoing functions is performed by using a hardware structure, a software module, or a combination of a hardware structure and a software module depends on a specific application and a design constraint condition of the technical solution.

A communication apparatus for implementing the foregoing methods in the embodiments of this application is described below with reference to the accompanying drawings. Therefore, all the foregoing content may be used in subsequent embodiments, and repeated content is not described again.

Figure 29:
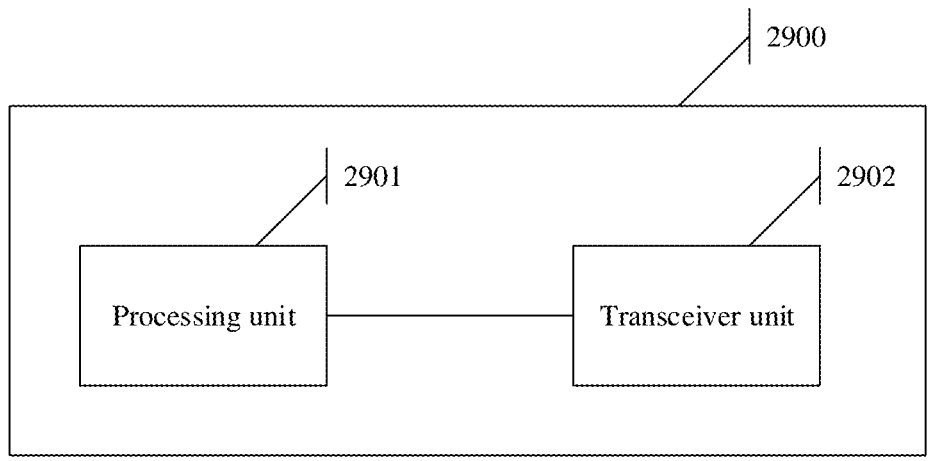
FIG. 29 is a schematic diagram of a structure of a communication apparatus according to an embodiment of this application.

FIG. 29 is a schematic diagram of a structure of a communication apparatus 2900. The communication apparatus 2900 can implement functions of the first device, for example, the terminal device, in the methods provided in the embodiments of this application. Alternatively, the communication apparatus 2900 may be an apparatus that can support the terminal device in implementing a corresponding function in the methods provided in the embodiments of this application. The communication apparatus 2900 may be a hardware structure, a software module, or a combination of the hardware structure and the software module. The communication apparatus 2900 may be implemented by a chip system. In this embodiment, the chip system may include a chip, or may include a chip and another discrete component.

The communication apparatus 2900 may include a processing unit 2901 and a transceiver unit 2902.

The processing unit 2901 may be configured to perform S51, S52, and S53 in the embodiment shown in FIG. 5, and/or be configured to support another process of the technology described in this specification.

The transceiver unit 2902 is used by the communication apparatus 2900 to communicate with another module, and may be a circuit, a component, an interface, a bus, a software module, a transceiver, or any other apparatus that can implement communication.

The transceiver unit 2902 may be configured to perform S54 and S55 in the embodiment shown in FIG. 5, and/or be configured to support another process of the technology described in this specification.

All related content of the steps in the foregoing method embodiments may be cited in function descriptions of corresponding function modules. Details are not described herein again.

Figure 30:
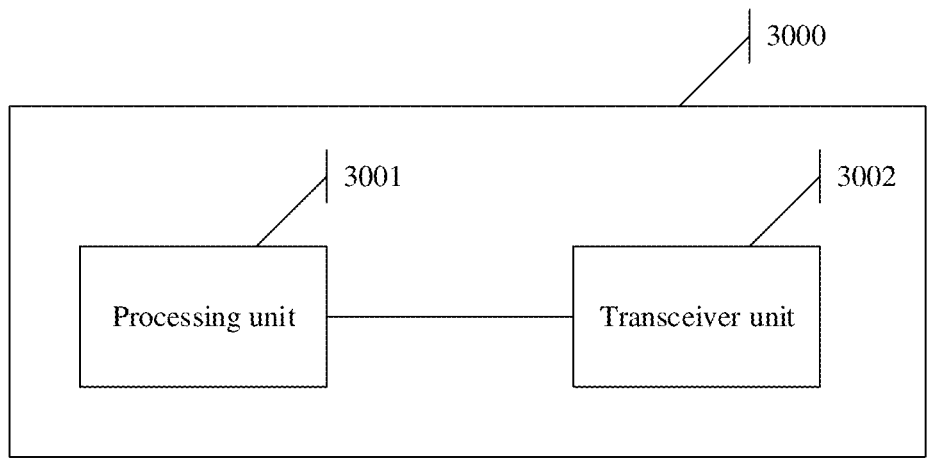
FIG. 30 is a schematic diagram of a structure of another communication apparatus according to an embodiment of this application.

FIG. 30 is a schematic diagram of a structure of a communication apparatus 3000. The communication apparatus 3000 can implement a function of the second device, for example, the terminal device, in the methods provided in the embodiments of this application. Alternatively, the communication apparatus 3000 may be an apparatus that can support the terminal device in implementing a corresponding function in the methods provided in the embodiments of this application. The communication apparatus 3000 may be a hardware structure, a software module, or a combination of the hardware structure and the software module. The communication apparatus 3000 may be implemented by a chip system. In this embodiment, the chip system may include a chip, or may include a chip and another discrete component.

The communication apparatus 3000 may include a processing unit 3001 and a transceiver unit 3002.

The processing unit 3001 may be configured to perform S51, S52, and S53 in the embodiment shown in FIG. 5, and/or be configured to support another process of the technology described in this specification.

The transceiver unit 3002 is used by the communication apparatus 3000 to communicate with another module, and may be a circuit, a component, an interface, a bus, a software module, a transceiver, or any other apparatus that can implement communication.

The transceiver unit 3002 may be configured to perform S54 and S55 in the embodiment shown in FIG. 5, and/or be configured to support another process of the technology described in this specification.

All related content of the steps in the foregoing method embodiments may be cited in function descriptions of corresponding function modules. Details are not described herein again.

Figure 31:
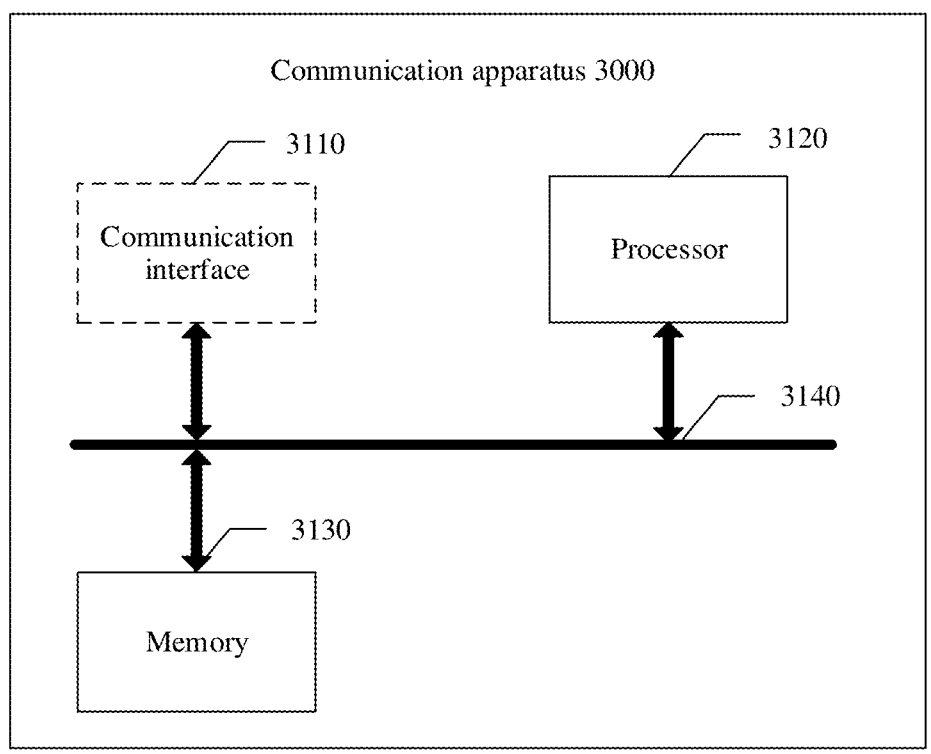
FIG. 31 is a schematic diagram of a structure of a communication apparatus according to an embodiment of this application.

FIG. 31 shows a communication apparatus 3100 according to an embodiment of this application. The communication apparatus 3100 may be a first device or a second device, and can implement a function of the terminal device in the methods provided in the embodiments of this application. Alternatively, the communication apparatus 3100 may be an apparatus that can support the first device or the second device in implementing a corresponding function in the methods provided in the embodiments of this application. The communication apparatus 3100 may be a chip system. In this embodiment, the chip system may include a chip, or may include a chip and another discrete component.

In hardware implementation, the transceiver unit 2902 or the transceiver unit 3002 may be a transceiver, and the transceiver is integrated into the communication apparatus 3100 to form a communication interface 3110.

The communication apparatus 3100 includes at least one processor 3120, configured to implement or support the communication apparatus 3100 in implementing a function of the first device or the second device in the methods provided in the embodiments of this application. For example, the processor 3120 may determine a first resource and a second resource, and control the first device to send data and/or control information on the first resource and/or the second resource. For details, refer to the detailed descriptions in the method examples. Details are not described herein again.

The communication apparatus 3100 may further include at least one memory 3130, configured to store program instructions and/or data. The memory 3130 is coupled to the processor 3120. Coupling in this embodiment is an indirect coupling or a communication connection between apparatuses, units, or modules, may be in an electrical, a mechanical, or another form, and is used for information exchange between the apparatuses, the units, or the modules. The processor 3120 may operate with the memory 3130 together. The processor 3120 may execute the program instruction stored in the memory 3130. At least one of the at least one memory may be included in the processor.

The communication apparatus 3100 may further include a communication interface 3110, configured to communicate with another device by using a transmission medium, so that an apparatus in the communication apparatus 3100 can communicate with the another device. For example, when the communication apparatus is the first device, the another device is the second device. The processor 3120 may send or receive data through the communication interface 3110. The communication interface 3110 may be specifically a transceiver.

In this embodiment, a specific connection medium between the communication interface 3110, the processor 3120, and the memory 3130 is not limited. In this embodiment, the memory 3130, the processor 3120, and the communication interface 3110 are connected through a bus 3140 in FIG. 31, and the bus is represented by a bold line in FIG. 31. A manner of connection between other components is schematically described, and is not limited thereto. The bus may be classified into an address bus, a data bus, a control bus, and the like. For ease of representation, only one thick line is used to represent the bus in FIG. 31, but this does not mean that there is only one bus or only one type of bus.

In this embodiment, the processor 3120 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In the embodiments of this application, the memory 3030 may be a non-volatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

It should be noted that the communication apparatus in the foregoing embodiment may be a terminal device, may be a circuit, or may be a chip applied to the terminal device, or another combined component or component that has a function of the terminal device. When the communication apparatus is the terminal device, the transceiver unit may be a transceiver, and may include an antenna, a radio frequency circuit, and the like. The processing module may be a processor, for example, a central processing unit (CPU). When the communication apparatus is the component having a function of the terminal device, the transceiver unit may be a radio frequency unit, and the processing module may be a processor. When the communication apparatus is a chip system, the transceiver unit may be an input/output interface of the chip system, and the processing module may be a processor of the chip system.

Figure 32:
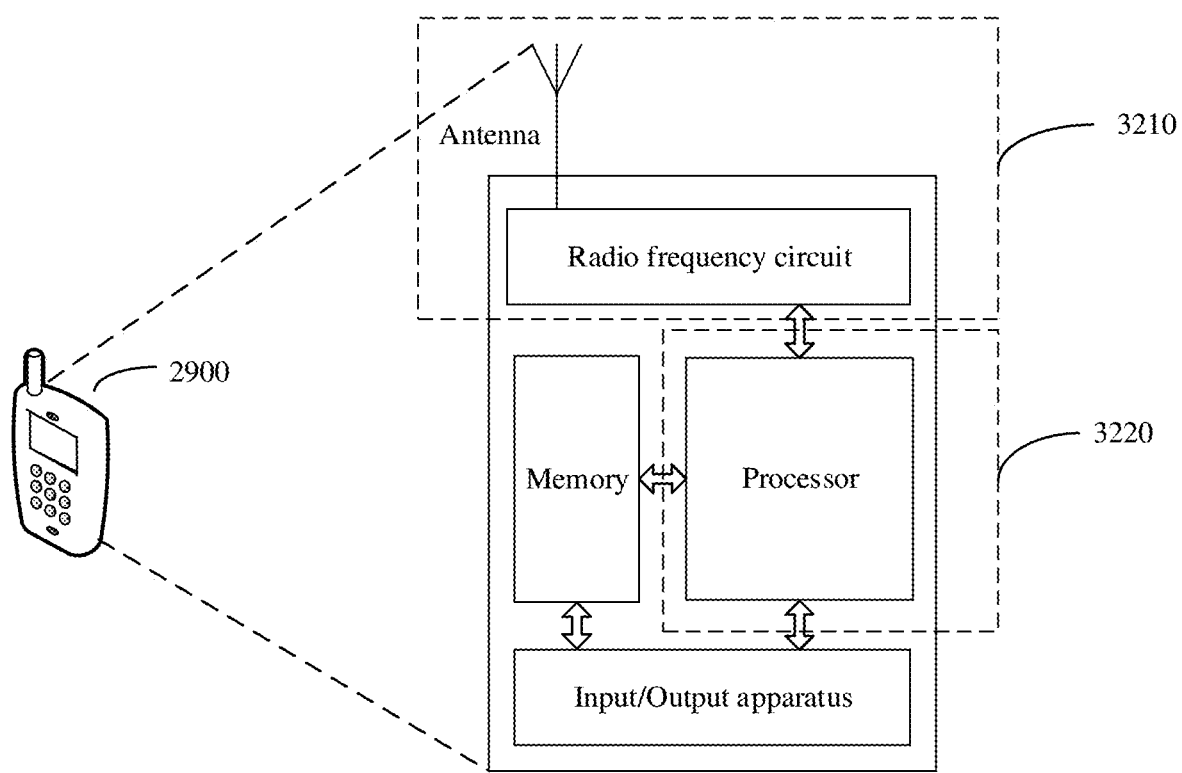
FIG. 32 is another schematic block diagram of a communication apparatus according to an embodiment of this application.

FIG. 32 is a simplified schematic diagram of a structure of a communication apparatus. For ease of understanding and illustration, in FIG. 32, a mobile phone is used as an example of the communication apparatus. As shown in FIG. 32, the communication apparatus includes a processor, a memory, a radio frequency circuit, an antenna, and an input/output apparatus. The processor is mainly configured to: process a communication protocol and communication data, and control the communication apparatus to execute a software program, process data of the software program, and the like. The memory is mainly configured to store the software program and the data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, or a keyboard, is mainly configured to receive data input by a user and output data to the user. It should be noted that some types of communication apparatuses may not have the input/output apparatus.

When data needs to be sent, the processor performs baseband processing on to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the communication apparatus, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 32. In an actual communication apparatus product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment, the antenna having receiving and sending functions and the radio frequency circuit may be considered as a transceiver unit of the communication apparatus, and the processor having a processing function may be considered as a processing unit of the communication apparatus. As shown in FIG. 32, the communication apparatus includes a transceiver unit 3210 and a processing unit 3220. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 3210 and that is configured to implement a receiving function may be considered as a receiving unit, and a component that is in the transceiver unit 3210 and that is configured to implement a sending function may be considered as a sending unit. In other words, the transceiver unit 3210 includes the receiving unit and the sending unit. The transceiver unit sometimes may also be referred to as a transceiver, a transceiver machine, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 3210 is configured to perform a sending operation and a receiving operation on the first device side in the foregoing method embodiments, and the processing unit 3220 is configured to perform an operation other than the sending operation and the receiving operation on the first device in the foregoing method embodiments.

For example, in an implementation, the transceiver unit 3210 may be configured to perform S54 and S55 in the embodiment shown in FIG. 5, and/or be configured to support another process of the technology described in this specification. The processing unit 3220 may be configured to perform S51, S52, and S53 in the embodiment shown in FIG. 5, and/or be configured to support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 33:
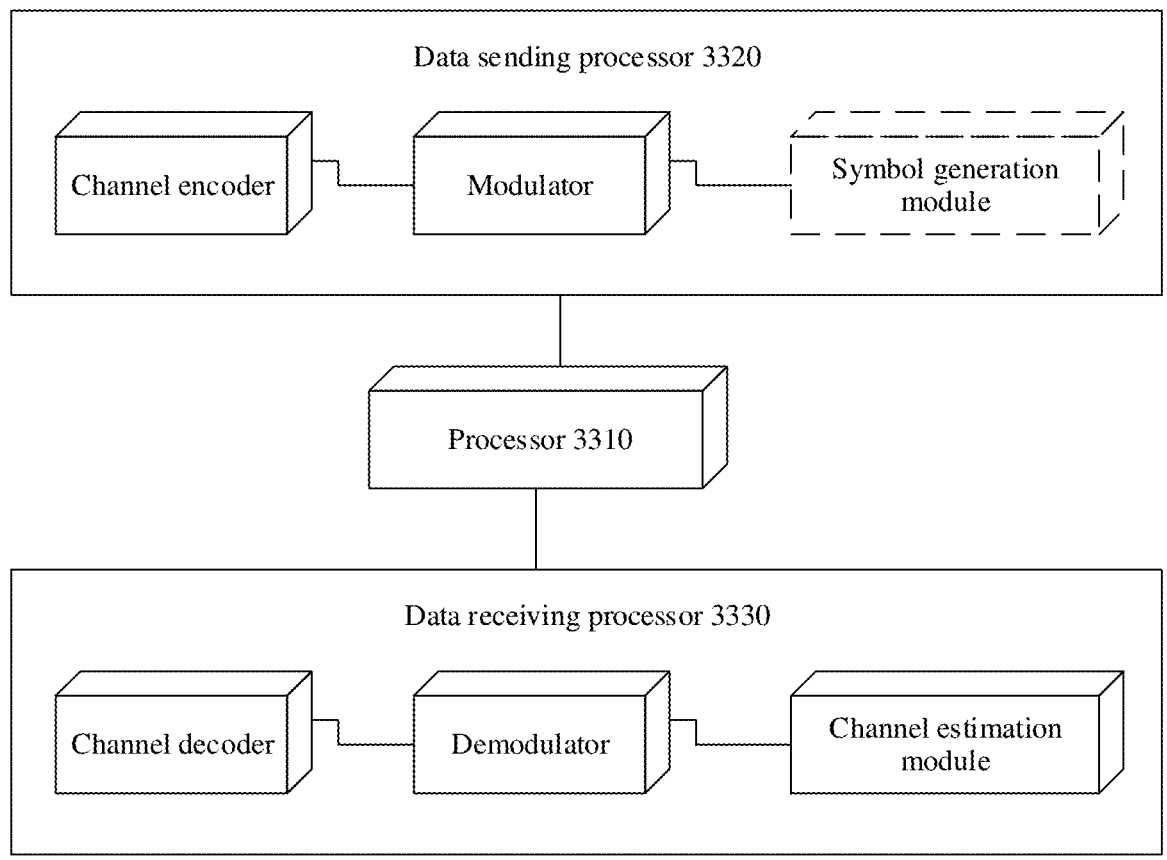
FIG. 33 is a schematic diagram of a structure of a communication apparatus according to an embodiment of this application.

In this embodiment, refer to the device shown in FIG. 33. For example, the device may implement a function similar to that of the processing unit 3220 in FIG. 32. In FIG. 33, the device includes a processor 3310, a data sending processor 3320, and a data receiving processor 3330. The processing unit 2901 or the processing unit 3001 in the foregoing embodiments may be the processor 3310 in FIG. 33, and implements a corresponding function. The processing unit 2901 or the processing unit 3001 in the foregoing embodiments may be the data sending processor 3320 and/or the data receiving processor 3330 in FIG. 33. Although FIG. 33 shows a channel encoder and a channel decoder, it may be understood that these modules are merely examples, and do not constitute a limitation on this embodiment.

Figure 34:
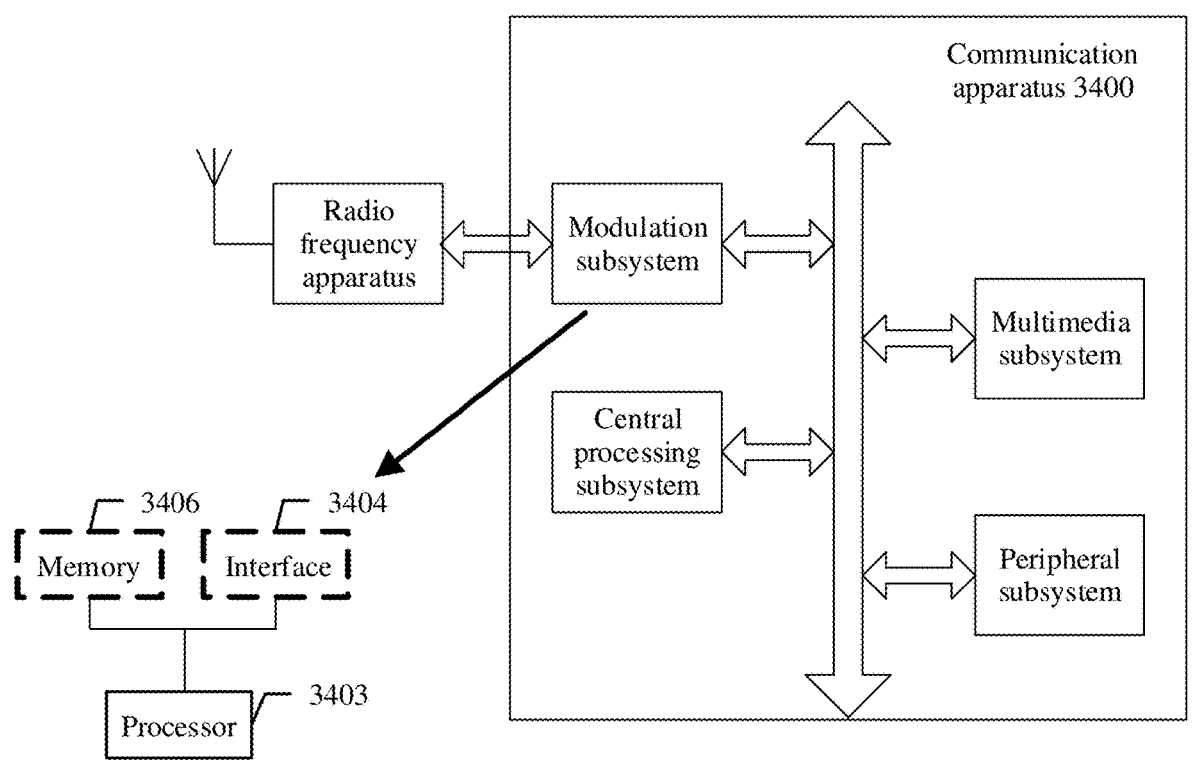
FIG. 34 is a schematic diagram of another structure of a communication apparatus according to an embodiment of this application.

FIG. 34 shows another form according to an embodiment. The communication apparatus 3400 includes modules such as a modulation subsystem, a central processing subsystem, and a peripheral subsystem. The communication apparatus in this embodiment may be used as the modulation subsystem. Specifically, the modulation subsystem may include a processor 3403 and an interface 3404. The processor 3403 completes a function of the processing unit 2901 or the processing unit 3001, and the interface 3404 completes a function of the transceiver unit 2902 or the transceiver unit 3002. In another variation, the modulation subsystem includes a memory 3406, a processor 3403, and a program that is stored in the memory 3406 and that can run on the processor. When executing the program, the processor 3403 implements the method of the first terminal apparatus or the second terminal apparatus in the foregoing method embodiments. It should be noted that the memory 3406 may be non-volatile or volatile. The memory 3406 may be located in the modulation subsystem, or may be located in the communication apparatus 3400, provided that the memory 3406 can be connected to the processor 3403.

An embodiment of this application further provides a communication system. Specifically, the communication system includes a first device and a second device, or may further include more terminal devices.

The terminal devices and a network device are respectively configured to implement functions of the related devices in FIG. 5 or FIG. 20. For details, refer to related descriptions in the method embodiments. Details are not described herein again.

An embodiment of this application further provides a computer-readable storage medium, including instructions. When the instructions are run on a computer, the computer is enabled to perform the method performed by the first device or the second device in FIG. 5 or FIG. 20.

An embodiment of this application further provides a computer program product, including instructions. When the instructions are run on a computer, the computer is enabled to perform the method performed by the first device or the second device in FIG. 5 or FIG. 20.

An embodiment of this application provides a chip system. The chip system includes a processor, may further include a memory, and is configured to implement the function of the first device or the second device in the foregoing methods. The chip system may include a chip, or may include a chip and another discrete component.

All or some of the foregoing methods in the embodiments of this application may be implemented by software, hardware, firmware, or any combination thereof. When software is used for implementation, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, a network device, a user device, or other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A communication method, comprising:
   determining, by a first device, a first resource and a second resource, wherein the first resource is used to send or receive first data, the second resource is used to send or receive control information, and the control information corresponds to second data; and
   upon determining that the first resource and the second resource overlap in at least one time domain symbol, performing, by the first device, first operations or second operations,
   wherein the first operations comprise sending or receiving, by the first device, the first data on a resource other than the at least one time domain symbol on the first resource, and sending or receiving, by the first device, the control information on the second resource;
   wherein the second operations comprise sending or receiving, by the first device, the first data on the first resource, and discarding or skipping receiving, by the first device, the control information in the at least one time domain symbol; and
   wherein the first resource is located in a first resource pool, the second resource is located in a second resource pool, and the second resource pool comprises transmission resources that are for the control information and whose period is N; and the first resource pool does not comprise a transmission resource for sending the control information, or the first resource pool comprises transmission resources that are for the control information and whose period is M, wherein M and N are positive integers, and M is greater than N.

2. The method according to claim 1, wherein performing the first operations or the second operations comprises performing the first operations upon determining that a priority of the first data is lower than a priority of the second data.

3. The method according to claim 1, wherein performing the first operations or the second operations comprises performing the second operations upon determining that a priority of the first data is higher than a priority of the second data.

4. The method according to claim 1, wherein the control information is hybrid automatic repeat request (HARQ) acknowledgement information or scheduling information indicating data transmission.

5. The method according to claim 1, wherein the first resource and the second resource are located in a same frequency band, a same carrier, or a same bandwidth part.

6. The method according to claim 1, wherein the first resource and the second resource are located in a same slot, the second resource is located in the last K symbols in the slot in which the first resource is located, and K is a positive integer greater than or equal to 1.

7. A communication apparatus, comprising one or more processors, and
   a memory configure to store program instructions that, when executed by the one or more processors, cause the communications apparatus to:
   determine a first resource and a second resource, wherein the first resource is used to send or receive first data, the second resource is used to send or receive control information, and the control information corresponds to second data; and
   upon determining that the first resource and the second resource overlap in at least one time domain symbol, perform first operations or second operations,
   wherein the first operations comprise sending or receiving the first data on a resource other than the at least one time domain symbol on the first resource, and sending or receiving the control information on the second resource;
   wherein the second operations comprise sending or receiving the first data on the first resource, and discarding or skipping receiving the control information in the at least one time domain symbol; and
   wherein the first resource is located in a first resource pool, the second resource is located in a second resource pool, and the second resource pool comprises transmission resources that are for the control information and whose period is N; and the first resource pool does not comprise a transmission resource for sending the control information, or the first resource pool comprises transmission resources that are for the control information and whose period is M, wherein M and N are positive integers, and M is greater than N.

8. The communication apparatus according to claim 7, wherein the communication apparatus is caused to perform the first operations upon determining that a priority of the first data is lower than a priority of the second data.

9. The communication apparatus according to claim 7, wherein the communication apparatus is caused to perform the second operations upon determining that a priority of the first data is higher than a priority of the second data.

10. The communication apparatus according to claim 7, wherein the control information is hybrid automatic repeat request (HARQ) acknowledgement information or scheduling information indicating data transmission.

11. The communication apparatus according to claim 7, wherein the first resource and the second resource are located in a same frequency band, a same carrier, or a same bandwidth part.

12. The communication apparatus according to claim 7, wherein the first resource and the second resource are located in a same slot, the second resource is located in the last K symbols in the slot in which the first resource is located, and K is a positive integer greater than or equal to 1.

13. A non-transitory computer-readable storage medium comprising instructions that, when executed by a computer, cause the computer to:
  determine a first resource and a second resource, wherein the first resource is used to send or receive first data, the second resource is used to send or receive control information, and the control information corresponds to second data; and
  upon determining that the first resource and the second resource overlap in at least one time domain symbol, perform first operations or second operations,
  wherein the first operations comprise sending or receiving the first data on a resource other than the at least one time domain symbol on the first resource, and sending or receiving the control information on the second resource;
  wherein the second operations comprise sending or receiving the first data on the first resource, and discarding or skipping receiving the control information in the at least one time domain symbol; and
  wherein the first resource is located in a first resource pool, the second resource is located in a second resource pool, and the second resource pool comprises transmission resources that are for the control information and whose period is N; and the first resource pool does not comprise a transmission resource for sending the control information, or the first resource pool comprises transmission resources that are for the control information and whose period is M, wherein M and N are positive integers, and M is greater than N.

14. The non-transitory computer-readable storage medium according to claim 13, wherein the computer is caused to perform the first operations upon determining that a priority of the first data is lower than a priority of the second data.

15. The non-transitory computer-readable storage medium according to claim 13, wherein the computer is caused to perform the second operations upon determining that a priority of the first data is higher than a priority of the second data.

16. The non-transitory computer-readable storage medium according to claim 13, wherein the control information is hybrid automatic repeat request (HARQ) acknowledgement information or scheduling information indicating data transmission.

17. The non-transitory computer-readable storage medium according to claim 13, wherein the first resource and the second resource are located in a same frequency band, a same carrier, or a same bandwidth part.

* * * * *

UNITED STATES PATENT AND TRADEMARK OFFICE
CERTIFICATE OF CORRECTION

PATENT NO. : 12,225,575 B2
APPLICATION NO. : 17/670574
DATED : February 11, 2025
INVENTOR(S) : Chao Li Page 1 of 1

It is certified that error appears in the above-identified patent and that said Letters Patent is hereby corrected as shown below:

In the Specification

Column 24, Line 24, change "GHZ" to --GHz--.

Signed and Sealed this
Eleventh Day of March, 2025

Coke Morgan Stewart
*Acting Director of the United States Patent and Trademark Office*